United States Patent [19]
Fossey et al.

[11] Patent Number: 5,361,268
[45] Date of Patent: Nov. 1, 1994

[54] SWITCHABLE TWO-WAVELENGTH FREQUENCY-CONVERTING LASER SYSTEM AND POWER CONTROL THEREFOR

[75] Inventors: Michael E. Fossey, Beaverton; Yunlong Sun, Aloha, both of Oreg.

[73] Assignee: Electro Scientific Industries, Inc., Portland, Oreg.

[21] Appl. No.: 64,515

[22] Filed: May 18, 1993

[51] Int. Cl.$^5$ ............................................. H01S 3/107
[52] U.S. Cl. ...................................... 372/23; 372/22; 372/27; 372/106
[58] Field of Search ................. 372/10, 12, 14, 20, 372/23, 27, 106, 108, 22

[56] References Cited

U.S. PATENT DOCUMENTS

| | | | |
|---|---|---|---|
| 4,048,515 | 9/1977 | Liu | 307/88.3 |
| 4,176,327 | 11/1979 | Wayne et al. | 331/94.5 M |
| 4,181,899 | 1/1980 | Liu | 331/94.5 C |
| 4,233,569 | 11/1980 | Liu | 331/94.5 C |
| 4,272,694 | 6/1981 | Jacobs | 307/427 |
| 4,331,891 | 5/1982 | Rizzo | 307/427 |
| 4,346,314 | 8/1982 | Craxton | 307/427 |
| 4,413,342 | 11/1983 | Cohen et al. | 372/22 |
| 4,450,563 | 5/1984 | Bepko | 372/23 |
| 4,498,179 | 2/1985 | Wayne et al. | 372/27 |
| 4,510,402 | 4/1985 | Summers et al. | 307/427 |
| 4,617,666 | 10/1986 | Liu | 372/22 |
| 4,618,957 | 10/1986 | Liu | 372/22 |
| 4,637,026 | 1/1987 | Liu | 372/22 |
| 4,649,544 | 3/1987 | Haas et al. | 372/27 |
| 4,727,552 | 2/1988 | Porte et al. | 372/20 |
| 4,841,528 | 6/1989 | Sipes, Jr. et al. | 372/22 |
| 4,933,947 | 6/1990 | Anthon et al. | 372/34 |
| 4,955,725 | 10/1990 | Johnson et al. | 372/22 |
| 4,971,416 | 11/1990 | Khanarian et al. | 350/96.12 |
| 5,001,716 | 3/1991 | Johnson et al. | 372/10 |
| 5,025,446 | 6/1991 | Kuizenga | 372/21 |
| 5,083,007 | 1/1992 | Spletter et al. | 219/121.64 |
| 5,204,867 | 4/1993 | Koschman | 372/10 |

OTHER PUBLICATIONS

C. Chen et al., "Recent Developments in Barium Borate" SPIE vol. 681 Laser and Nonlinear Optical Materials, pp. 12–19 (1986) No month available.

J. J. Zayhowski, "Polarization Switching of Microchip Lasers" Conference on Lasers and Electro-Optics (1991) (May) vol. 10, pp. 38–39 Technical Digest Series (Conference Edition).

W. Koechner, *Solid-State Laser Engineering*, pp. 414–422, 477–513 (2d ed.) (Springer-Verlag) (1988) No month available.

J. J. Zayhowski, "Microchip Lasers," Conference on Lasers and Electro-Optics, 1991 Technical Digest Series, vol. 10 (Conference Edition), at p. 350 (1991) No month available.

Primary Examiner—Rodney B. Bovernick
Assistant Examiner—Robert McNutt
Attorney, Agent, or Firm—Stoel Rives Boley Jones & Grey

[57] ABSTRACT

A laser system and power control have a polarization state changer that produces in response to an incident beam with selected polarization state at a first wavelength $\lambda_1$ a beam at $\lambda_1$ with a desired polarization state. A frequency converter responds to the beam at $\lambda_1$ with the desired polarization state to produce a frequency converted beam at a second, different wavelength $\lambda_2$. When the polarization state changer and the frequency converter are located within a laser cavity, the laser system is operable in three different states and produces an output beam at $\lambda_1$ or $\lambda_2$, or no output beam, depending on the polarization state changer. In this intracavity configuration the polarization state changer is also operable as a Q-switch. When the polarization state changer and the frequency converter are located outside a laser cavity, the polarization state changer is operable in the whole range between its first and third states; the device thus produces an output beam at $\lambda_2$, an output beam including components at $\lambda_1$ and $\lambda_2$, or an output beam having no component at $\lambda_2$, again depending on the polarization state changer. In the extracavity configuration the power in the output at $\lambda_2$ is continuously controllable between a maximum and zero.

43 Claims, 16 Drawing Sheets

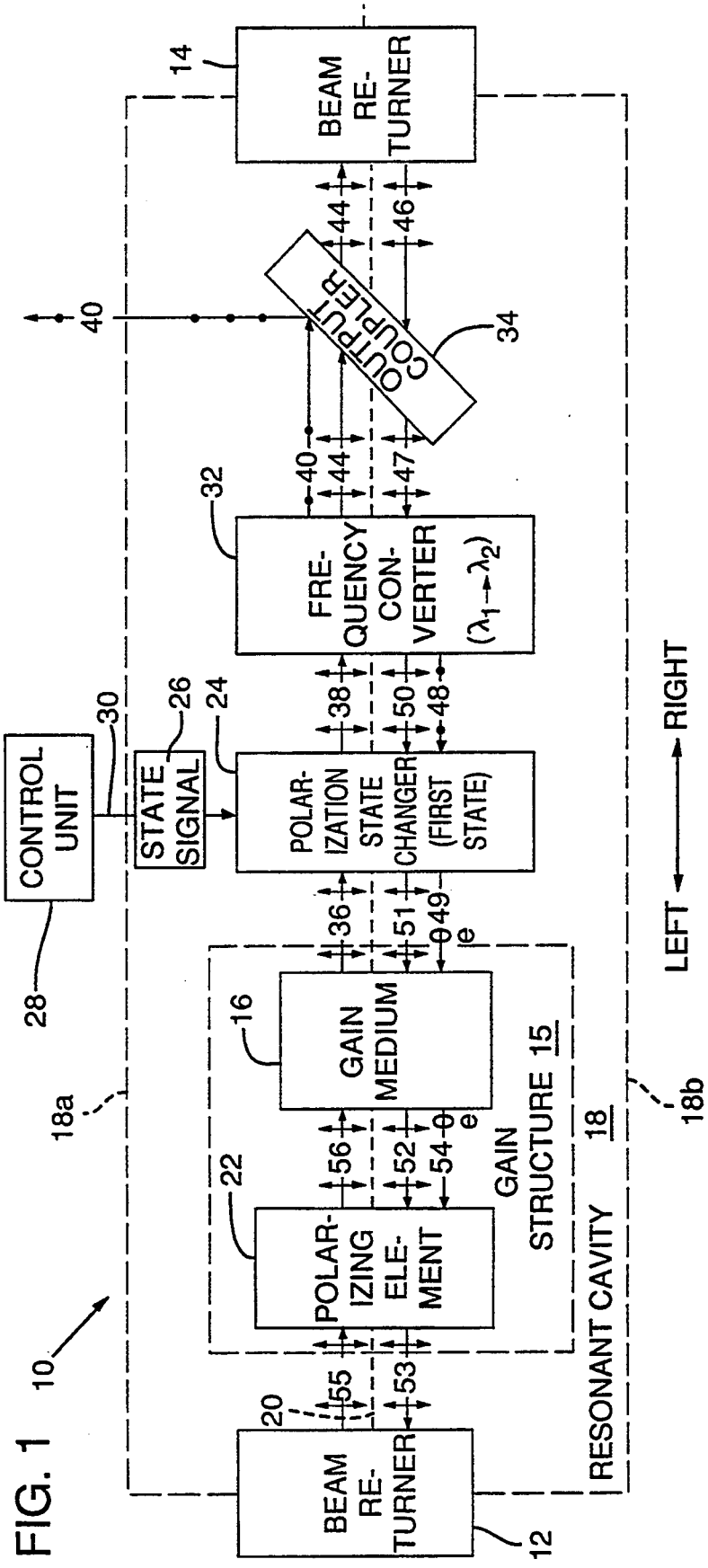

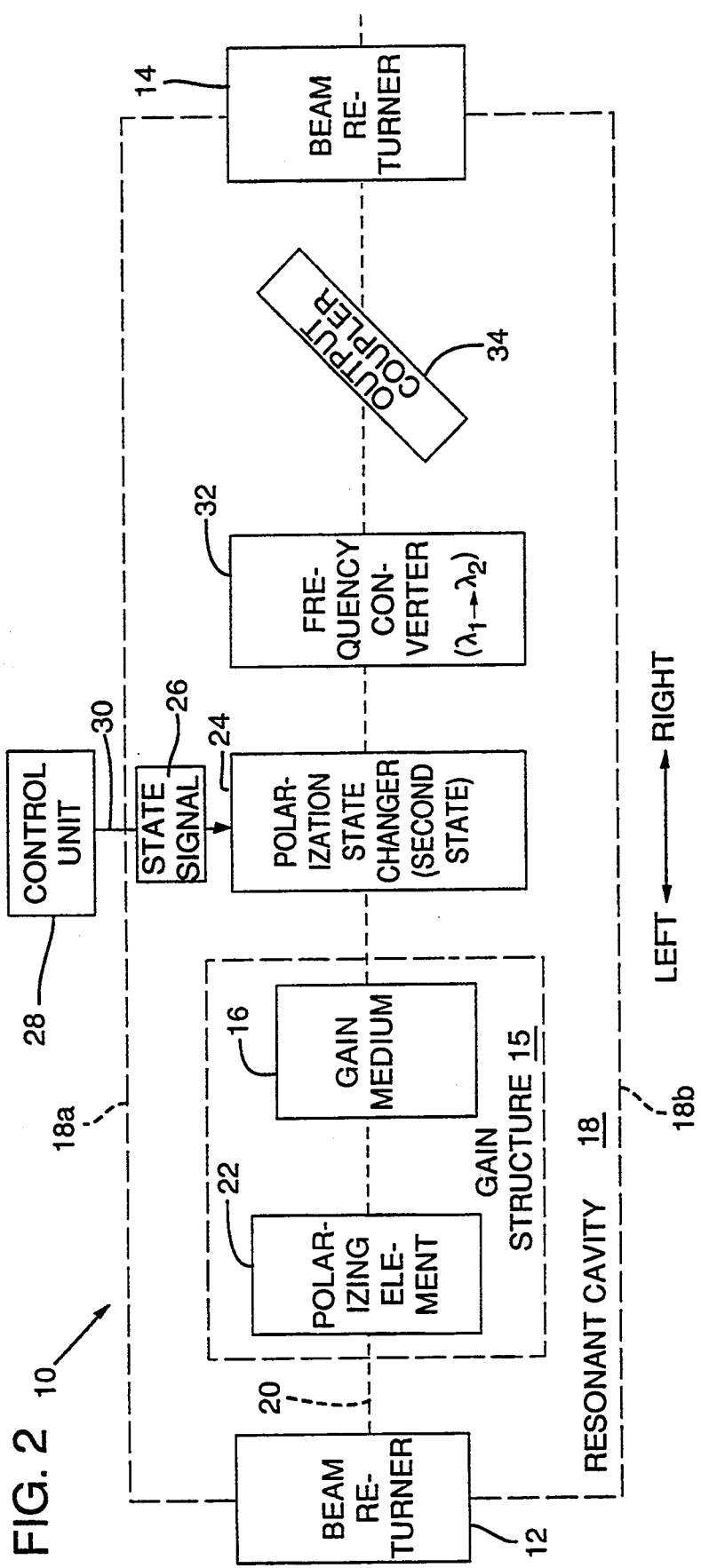

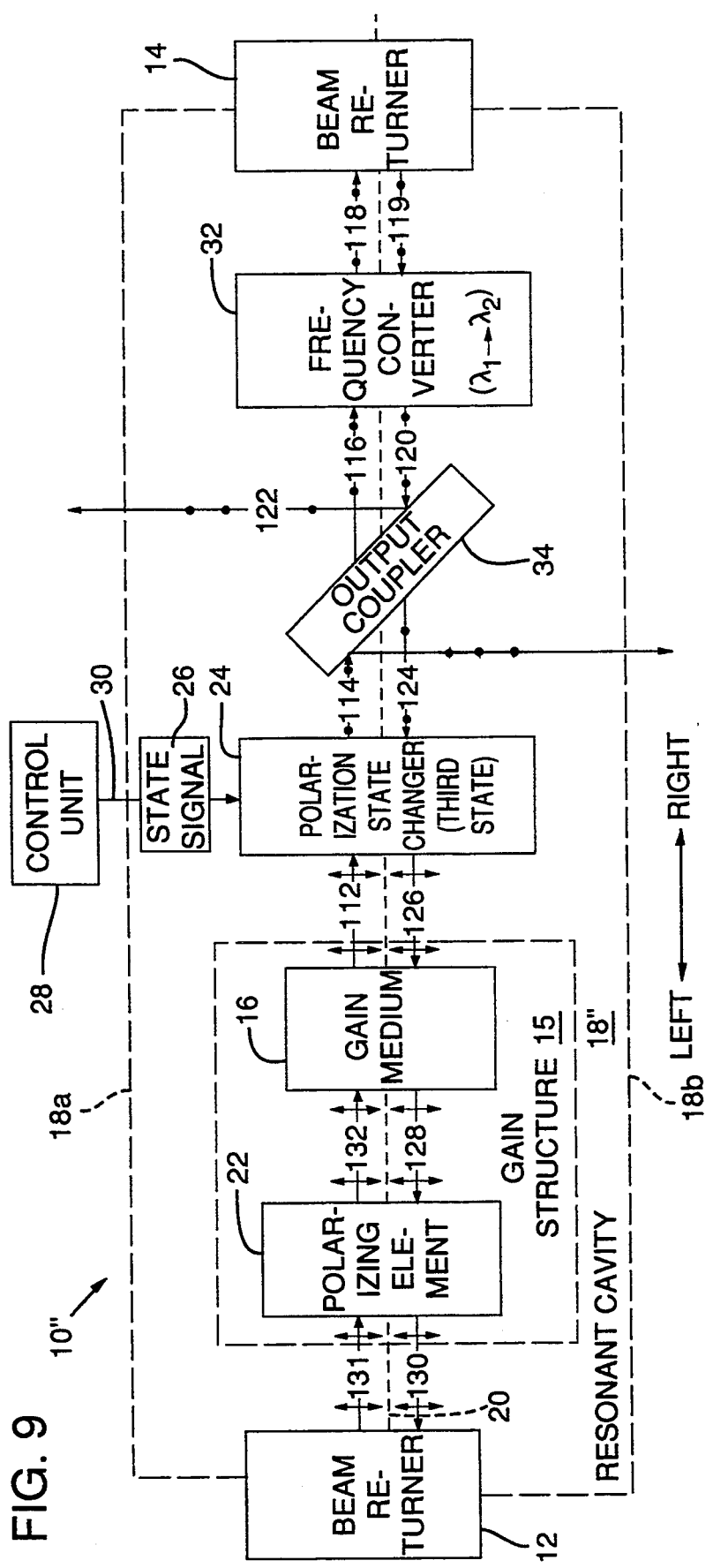

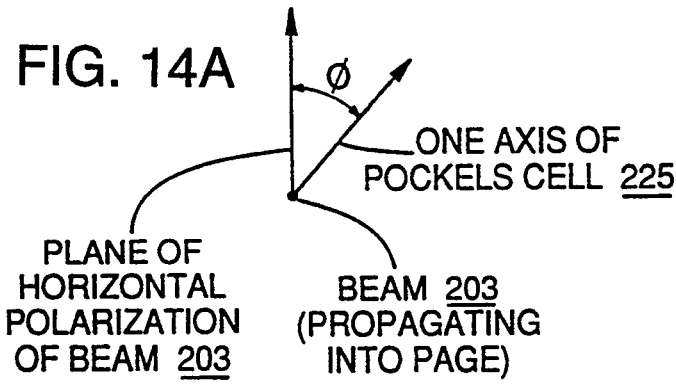
FIG. 14A
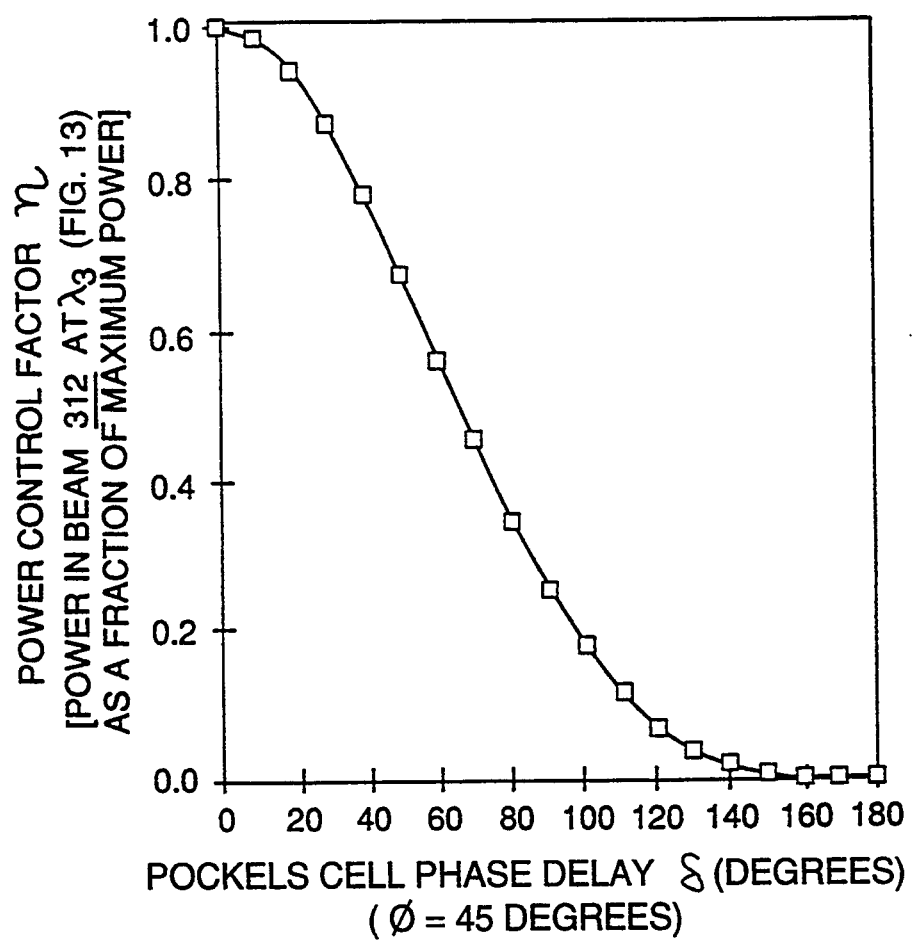
FIG. 14B  POWER CONTROL FACTOR $\eta$ FOR POLARIZATION STATE CHANGER 224 WITH POCKELS CELL 225

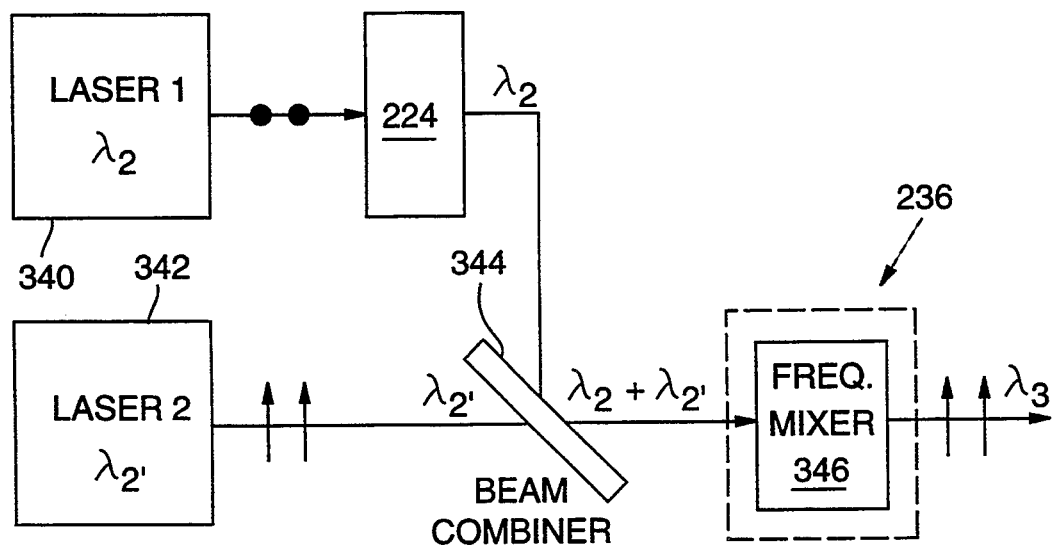

SWITCHABLE TWO-WAVELENGTH FREQUENCY-CONVERTING LASER SYSTEM AND POWER CONTROL THEREFOR

TECHNICAL FIELD

This invention relates to lasers and laser systems having two different output wavelengths; to apparatus for producing either continuous-wave or Q-switched output pulses from lasers and laser systems switchable between two different wavelengths; to apparatus for controlling the power in the output of a laser or a laser system; and to apparatus for producing and controlling a mixture of two different output wavelengths of a laser or a laser system.

BACKGROUND OF THE INVENTION

It is often desirable for a laser to emit coherent electromagnetic radiation at either of two different, widely-separated wavelengths. In many laser applications laser radiation at one wavelength would be desirable for performing one function, and laser radiation at another, much shorter wavelength would be desirable for performing another function. As one example, in machining metals with lasers it can happen that solid metal melts readily when exposed to laser radiation at one wavelength but that molten metal remains in a molten state and vaporizes more readily when exposed to laser radiation at another wavelength much longer than the first wavelength. As another example, in laser etching of layers of a photoresist it can happen that a layer of photoresist vaporizes when exposed to laser radiation at a first wavelength and that the gaseous vapors absorb laser radiation at the first wavelength while transmitting laser radiation at a second wavelength much shorter than the first wavelength. In such an application it is convenient to use laser radiation at the first wavelength to vaporize the photoresist and then to use laser radiation at the second wavelength to perform operations on materials from which the layer of photoresist has been vaporized.

In many of these applications rapid switching of the laser output between the two wavelengths would be quite useful. Unfortunately, presently available laser systems do not provide rapid switching between two widely-separated wavelengths.

Many lasers change from one output wavelength to another output wavelength only by mechanical motion of some part. For many applications, including precision applications, mechanical movements connected with tuning between the two wavelengths are detrimental. The speed of mechanical movements is limited by the inertia of parts which must be moved. Mechanical movements can also create undesirable vibrations.

In other types of lasers the wavelength at which lasing action occurs can be changed by changing the gain medium. For example, the wavelength at which lasing action occurs can be changed in a dye laser by changing the dye and in a gas laser by changing the gas. Such ways of changing the wavelength are usually relatively slow.

In addition, solid-state optical parametric oscillation lasers have a very wide tuning range, but the power levels and stability of such lasers are unsuitable for many industrial applications.

Some workers have developed lasers which lase at two or more wavelengths simultaneously. In such lasers the range of wavelengths at which simultaneous lasing occurs is often relatively narrow. Moreover, in such lasers it may be difficult to switch quickly between these laser wavelengths.

Other workers have developed lasers in which the lasing action can be tuned over a range of wavelengths. Such lasers include titanium-sapphire tunable lasers and chromium-alexandrate tunable lasers. The tuning entails mechanical motion, and the tuning range is usually relatively narrow.

For other tunable laser systems, important parameters such as power and pulse width are not acceptable for some industrial applications.

There is accordingly a need for a laser having an output which is rapidly switchable between a first wavelength and a second, much shorter wavelength without mechanical movements.

Those working in applications of lasers have long known of Q-switching and of its practical uses. Q-switching produces a high-intensity pulse of coherent electromagnetic radiation from a laser. The laser cavity is initially maintained in a condition in which lasing is inhibited while the gain medium is pumped with input energy. In that condition a substantial population inversion accumulation is created and maintained in the gain medium. The state of the laser cavity is then changed to a condition in which lasing is no longer inhibited. The gain medium then quickly releases the energy stored in the population inversion accumulation in a high-intensity pulse of coherent electromagnetic radiation. The peak power delivered from a laser by such a Q-switched output is considerably higher than the power delivered in continuous-wave operation of the laser.

Because Q-switching has a wide variety of important practical applications, a laser which is rapidly switchable between a first wavelength and a second, much shorter wavelength should also have the capability of delivering Q-switched output pulses at each of those two wavelengths.

In many practical laser applications, and particularly in laser machining, it is necessary to achieve a power level in a beam of coherent electromagnetic radiation which is high enough to perform a desired operation on a target. There are two ways to produce such a beam.

First, a gain medium may be selected which produces a beam at a desired wavelength.

Second, frequency conversion (e.g., doubling, tripling, quadrupling, or two wave mixing) may be used to generate a beam at a desired wavelength from a beam at a different (usually longer) wavelength. As an example, the gain medium neodymium yttrium-aluminum-garnet ("Nd:YAG") produces a high-power output beam at a wavelength of approximately 1064 nanometers. That beam is then passed through a frequency doubler, which generates from the beam at 1064 nanometers a coherent output beam at approximately 532 nanometers. The output beam at 532 nanometers is then used to perform the desired operations, such as laser machining of a workpiece.

A first prior art method of controlling laser beam power is to use a conventional polarization-based attenuator that includes a polarization state changer located between a polarizer and a crossed analyzer. The polarization state changer rotates the polarization direction of the beams passing through the polarizer so that the analyzer produces a desired degree of attenuation of the beams incident to it. The polarization state changer must withstand high-power beams. This limits the usefulness of conventional polarization state changers such as liquid crystals, which can be used only at very low power levels because of their low damage thresholds. This prior art method, if used in an intracavity location, can also impair the stable operation of the gain medium.

A second prior art method of controlling the power is to vary the pumping energy which drives the gain medium. This method is limited by the narrow range of stable operation of many laser devices.

A third prior art method of controlling the power is to use movable laser mirrors with a surface having different attenuation ratios at different locations. The mirror is moved so that the beam strikes the mirror at a location with the desired attenuation ratio. The required mechanical motions make this third prior art method inherently slow. In addition, where several mirrors are used to achieve a variety of different attenuation combinations, it is difficult to maintain the necessary accuracy in the location of the beam path.

A fourth prior art method of controlling the power is to use an acousto-optical attenuation device. However, to realize a full dynamic range of power control (that is, to control the power from zero to 100 percent of maximum output power), only the first order of the beam deflected by the acousto-optical attenuation device can be used as the working beam. The maximum output power in the first order beam deflected by an acousto-optical attenuation device is only a few percent of the total input beam power available. Thus, power control using an acousto-optical attenuation device is feasible only for applications which require a low power level.

There is a variety of practical problems encountered in laser machining which cannot be overcome because of the foregoing limitations.

When Q-switched pulses are used in industrial applications such as laser machining, the area illuminated by the laser beam is moved slowly over a surface, or through a region, of a workpiece, with the Q-switched pulses forming a series of overlapping spots. To achieve uniform and predictable machining of a workpiece when such a series of overlapping spots is used, it is important that the power delivered by the beam be uniform among the pulses at different times. A particular problem in achieving such uniformity is caused by differing time intervals between pulses. The power released by a gain medium in a Q-switched output pulse depends on the time the gain medium has been pumped before that Q-switched output pulse.

The time between Q-switched output pulses of a laser used for laser machining varies considerably during the course of many machining operations. First, the first Q-switched pulse of a machining operation usually has considerably more power than succeeding pulses because the gain medium has been pumped for a relatively long time before the first Q-switched pulse. To eliminate this high-power pulse, many laser machining systems simply aim the laser beam away from the workpiece for that first pulse. This initial step is inconvenient because it requires additional operations and equipment. Second, during the process of machining a workpiece, the Q-switched pulse repetition rate typically varies as the laser beam carries out different types of machining operations. For example, as the laser beam turns a corner over the surface of a workpiece, the repetition rate typically decreases, often because a longer time is required to move the area or region to be illuminated by the beam around a corner than that required to move in a straight line.

There accordingly is a need for apparatus capable of providing precise control of the power in Q-switched pulses of coherent beams. There is a similar need when the beam is produced in continuous-wave operation. In addition, any such apparatus should be capable of adjusting the power in Q-switched pulses on a time scale faster than the pulse repetition rates encountered in typical laser machining applications. Pulse repetition rates of several kilohertz are common in laser machining applications, and any apparatus to control the power in a coherent beam should be able to vary the power level between adjacent pulses of a pulse train at such a repetition rate.

SUMMARY OF THE INVENTION

One object of the invention is to provide a laser with a laser output that can be rapidly switched from a first wavelength to a second, much shorter wavelength.

Another object of the invention is to provide in such a switchable-wavelength laser the capability of delivering Q-switched output pulses at both the first wavelength and the second wavelength.

Another object of the invention is to provide a system for controlling the intensity of laser output.

Another object of the invention is to provide a system for controlling the intensity of laser output as the pulse repetition rate of a train of Q-switched pulses varies.

Another object of the invention is to provide a system for varying the intensity of laser output according to a predetermined routine.

Another object of the invention is to provide an apparatus for controlling the power in pulse trains of Q-switched laser beams in times less than the time between such pulses, and particularly in times less than the interval between Q-switched pulses at a repetition rate of the order of several kilohertz.

The invention satisfies the needs and meets the objects described above by providing a laser system that includes a polarization state changer operatively associated with a frequency converter to produce an output beam at a wavelength that differs from that of an input beam. The polarization state changer responds to an applied signal to change the polarization state of an incident beam at a first wavelength $\lambda_1$, and the frequency converter receives the beam propagating from the polarization state changer to produce an output beam at a second, different wavelength $\lambda_2$.

Preferably the polarization state changer is a Pockels cell, which is selectively operable to pass the incident beam without change of polarization state or to produce from a linearly polarized incident beam an output beam in a circular or linear polarization state, or in any of a continuous range of elliptical polarization states. The frequency converter can be of any kind that produces a beam at $\lambda_2$ from the appropriate polarization component of the input beam at $\lambda_1$. All Type I frequency converters (such as frequency doublers, triplers, and quadruplers, and optical parametric oscillators) require a linearly polarized input beam at wavelength $\lambda_1$ and produce the output beam at $\lambda_2$ in a polarization state orthogonal to that of the incident beam at $\lambda_1$. Type II frequency converters operate to produce an output beam at $\lambda_2$ from an input beam at $\lambda_1$ having two orthogonal linearly polarized components. The output beam at $\lambda_2$ is also linearly polarized and has the same polarization state as one of the two linearly polarized input beams at $\lambda_1$. Such frequency converters convert only from the portion of the input beam at $\lambda_1$ with the desired polarization direction to produce the output beam at $\lambda_2$. The polarization state changer controls the power in the desired component and thus the conversion efficiency by changing the polarization state of the incident beam.

The beam at $\lambda_1$ incident on the polarization state changer, and from which the beam incident on the frequency converter is derived, is generated by a gain medium operating in a laser cavity. The polarization state changer and the frequency converter may be located inside or outside the laser cavity in which the beam at $\lambda_1$ is generated.

The laser system of the invention is operable in an intracavity configuration in which the system is placed in one of first, second, and third operative states to produce, respectively, an output beam at $\lambda_2$, no output beam, and an output beam at $\lambda_1$.

The laser system of the invention is also operable in an extracavity configuration in which the polarization state changer is operated to produce from the input beam at $\lambda_1$ a beam at $\lambda_1$ in an elliptical polarization state. The frequency converter generates a beam at $\lambda_2$ from the desired component of the elliptically-polarized beam at $\lambda_1$. The power in the beam at $\lambda_2$ is thus controlled by the particular elliptical polarization state of the output from the polarization state changer.

The laser system of the invention may also include a control unit for controlling the condition of the polarization state changer by varying that condition among the discrete first, second, and third states in the intracavity configuration and by varying that condition continuously between the first and third operative states in the extracavity configuration.

The laser system of the invention may also include (a) a direct detector for detecting the condition of a target (such as a workpiece) under illumination by the output beam and/or (b) detection unit(s) for sensing the power in the beam(s) from the frequency converter. The control unit may be responsive to either or both of the direct detector and the detection unit(s) to operate the laser system in closed loop control. Alternatively, the control unit may operate the laser system in open loop control. The control unit preferably operates the laser system pursuant to a routine.

In a preferred intracavity configuration in which the polarization state changer is a Pockels cell and the frequency converter is a Type I cut frequency doubling crystal, the laser of the invention has an output of linearly polarized coherent electromagnetic radiation at $\lambda_2$ when the polarization state changer is in its first operative state, no output of coherent electromagnetic radiation when the polarization state changer is in its second operative state, and an output of linearly polarized coherent electromagnetic radiation at $\lambda_1$ when the polarization state changer is in its third operative state. Because the polarization state changer may be rapidly changed between operative states, the invention meets the need, described above, for rapid, non-mechanical switching of laser output between two wavelengths.

The invention also provides Q-switching for coherent radiation at each of $\lambda_1$ and $\lambda_2$. The polarization state changer is placed and held in the second operative state until a desired degree of population inversion has occurred in the gain medium. The polarization state changer is then changed to either (1) the first operative state, in which case the laser output is a Q-switched pulse of coherent radiation at $\lambda_2$, or (2) the third operative state, in which case the laser output is a Q-switched pulse of coherent radiation at $\lambda_1$.

The invention is particularly useful in repair of a flat panel electronic device such as a large area liquid crystal display ("LCD"). Such an LCD typically has electrically-conductive links or paths formed as a patterned film of metal on a glass substrate. In repairing such an LCD it is necessary to make links (i.e., to establish electrical connections) and to cut links (i.e., to sever electrical connections). The longer output wavelength (such as infrared) from the switchable-wavelength laser is used to cut links; the shorter output wavelength (such as green) from the switchable-wavelength laser is used to repair links.

A preferred extracavity configuration of the invention provides a system for controlling the laser system output beam intensity at either $\lambda_1$, $\lambda_2$, or (subject to certain constraints) both $\lambda_1$ and $\lambda_2$. The control unit controls the polarization state changer, which in turn controls a power factor $\eta$ determining what fraction the power in the beam at $\lambda_2$ is of the maximum power the laser system of the invention can generate at $\lambda_2$. Control of the polarization state changer also indirectly controls the power the laser system of the invention can generate at $\lambda_1$. With optional shutters, the beam at $\lambda_1$ or the beam at $\lambda_2$ may be cut off.

With this extracavity configuration, the laser system may be operated by the control unit according to a routine for synchronizing the wavelength, the wavelength mixture, and the output beam intensity with a desired set of operations to be performed on a workpiece, with the characteristics of the system for repositioning the area on (or region in) the workpiece to be illuminated by the laser output, and with the characteristics of the laser system.

The invention also provides an apparatus for achieving very rapid control of the power in Q-switched pulses of a laser beam. A control unit varies the delay $\delta$ imposed by the polarization state changer so as to vary (as explained above) the power in the output beams at $\lambda_1$ and $\lambda_2$. In one preferred alternative, the polarization state changer is a Pockels cell controlled by an electronic control unit. The Pockels cell polarization state changer operates sufficiently fast (on the order of nanoseconds) that the power in the beams at $\lambda_1$ and $\lambda_2$ may be varied faster than pulse repetition rates (which are as high as 20 kilohertz or somewhat higher in the case of a Nd:YAG laser) which are of present commercial interest. In another preferred alternative, the polarization state changer is a rotatable wave plate. Although a rotatable wave plate is slow, it is simple and has a low cost. It is also very thin, with the result that its precise alignment perpendicular to a beam path does not significantly affect the positional accuracy of the beams passing through it. In the extracavity configuration the invention is also usable to control the intensity of continuous-wave beams at a frequency-converted wavelength. Whether the polarization state changer is a Pockels cell or a rotatable wave plate, the polarization state changer causes little power loss and provides excellent power control dynamic range.

This embodiment of the invention is particularly useful when the wavelength to be used in laser machining is in the ultraviolet region of the electromagnetic spectrum, because alternative means are not available for controlling the power in Q-switched pulses of ultraviolet beams which have enough power to be of interest for laser machining. One preferred way of using the laser system of the invention is first to generate in a first Type I cut frequency doubling crystal a beam at 532 nanometers from a beam at 1064 nanometers produced by a Nd:YAG gain medium, and then to generate in a second Type I frequency doubling crystal and to control according to the invention another beam at 266 nanometers. However, the invention is not restricted to such frequencies. All that is necessary to this embodiment are a suitable source of a beam at a wavelength $\lambda_1$ and suitable frequency converters for producing beams at other desired wavelengths $\lambda_2$ and $\lambda_1$ or, in the case of frequency mixing, suitable input beam sources at $\lambda_2$ and $\lambda_2'$ for producing a beam at another desired wavelength $\lambda_3$.

With the power control system of the invention, the pumping level of the gain medium does not have to be adjusted to control the output beam power. Instead, the pumping level of the gain medium is established at a level which produces the optimum laser performance in such other important areas as power stability, beam divergence, and beam mode quality. Thus, by separating power control from the operation of the gain medium, the invention permits improvement in laser operation which go well beyond the improvements in beam power control which were the initial objects of the invention.

Additional objects and advantages of the present invention will be apparent from the following detailed description of preferred embodiments thereof, which proceeds with reference to the accompanying drawings.

BRIEF DESCRIPTION OF THE DRAWINGS

FIG. 1 depicts a first embodiment of the invention (an intracavity configuration) in a first state in which beams exiting an output coupler and a gain medium are of different wavelengths.

FIG. 2 shows the first embodiment of the invention in a second state that produces no laser output.

FIG. 9 shows the third embodiment of the invention in a third state in which beams exiting the output coupler and the gain medium are of the same wavelength.

FIG. 14A illustrates the definition of the angle $\phi$ between an axis of a Pockels cell polarization state changer and the plane of polarization of the beam 203 in FIGS. 10–13.

FIG. 14B is a graph of the power control factor $\eta$ of a frequency-converted beam shown in FIG. 13 against the phase delay $\delta$ between two orthogonal components of the original beam introduced by a Pockels cell polarization state changer shown in FIG. 13.

FIG. 16 shows an optical component arrangement that achieves power control of output light resulting from laser frequency mixing.

DETAILED DESCRIPTION OF PREFERRED EMBODIMENTS

Figure 1A:
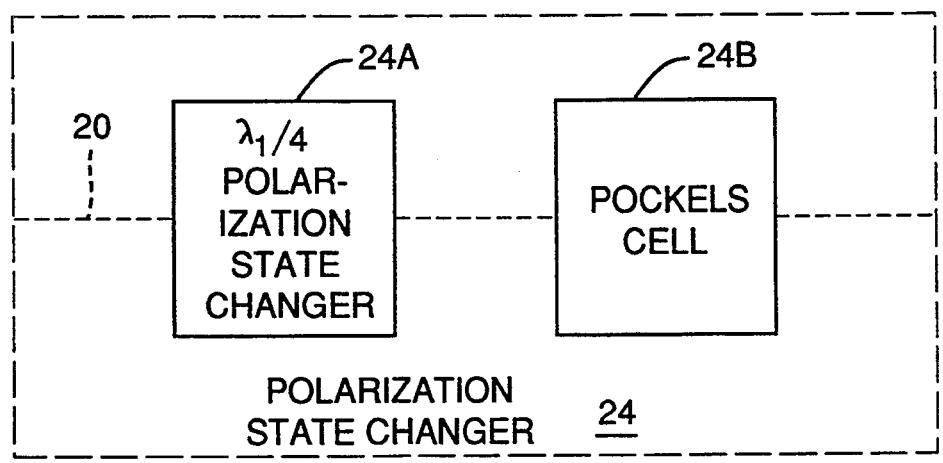
FIG. 1A shows an alternative polarization state changer that can be implemented in the systems of FIGS. 1–13 and 16.

The following explains certain conventions adopted for the detailed description presented below. To simplify the discussion herein (a) the polarization state of the beam which passes through the polarizing element 22 (see FIGS. 1–3 and 7–9) or through the inherently linearly polarized gain medium 16' (see FIGS. 4–6) is referred to as "vertically polarized" and (b) the polarization state which is orthogonal to the plane of polarization defined by the polarizing element 22 or by the inherently linearly polarized gain medium 16" is referred to as "horizontally polarized." Skilled persons will appreciate that this conventional terminology does not require the planes of polarization actually to be vertical or horizontal.

FIGS. 1–9 indicate directions as "left" or "right." Those direction indications are solely for ease of explanation; the laser of the invention may be oriented in any direction.

FIGS. 1–13 indicate certain polarization states for various beams. Arrows associated with a beam indicate that the beam is vertically polarized. Dots associated with a beam indicate that the beam is horizontally polarized. A circular symbol associated with a beam and accompanied by the letter "e" indicates that the beam is in an elliptical (which includes circular) polarization state.

In each of FIGS. 1–13 (other than FIGS. 2, 5, and 8) various beams are indicated as propagating in the same direction. Those beams propagate substantially along a common path (such as the path 20 of FIGS. 1–9 or the path 220 of FIGS. 10–13) and are shown separate from that path and from each other for ease of explanation only.

The laser system of the invention is arranged in two basic configurations. The first configuration, described with reference to FIGS. 1-9, has intracavity frequency conversion. The second configuration, described with reference to FIGS. 10-16, has extracavity frequency conversion. Generally speaking, laser systems using extracavity conversion are more stable and less susceptible to damage than laser systems using intracavity conversion.

FIG. 1 shows a first embodiment 10 of the laser system of the invention. Referring to FIG. 1, a switchable two-wavelength laser 10 includes a first beam returner 12, a second beam returner 14, and a gain structure 15. Each of beam returners 12 and 14 is preferably a conventional laser mirror with a reflective metallic surface or a dielectric mirror. The beam returners 12 and 14, together with the gain structure define a resonant cavity 18 within which lasing action can occur along a lasing path 20 at substantially a first wavelength $\lambda_1$ characteristic of a gain medium 16 and the cavity. Cavity 18 is within the dashed lines 18a and 18b.

As shown in FIG. 1, gain structure 15 includes gain medium 16 and a polarizing element 22 disposed within the cavity 18 and along a lasing path 20 between beam returner 12 and gain medium 16. Pumping energy is supplied to gain medium 16 by an energy source (not shown). Gain medium 16 is preferably Nd:YAG, which produces an output beam at approximately 1064 nanometers.

Figure 4:
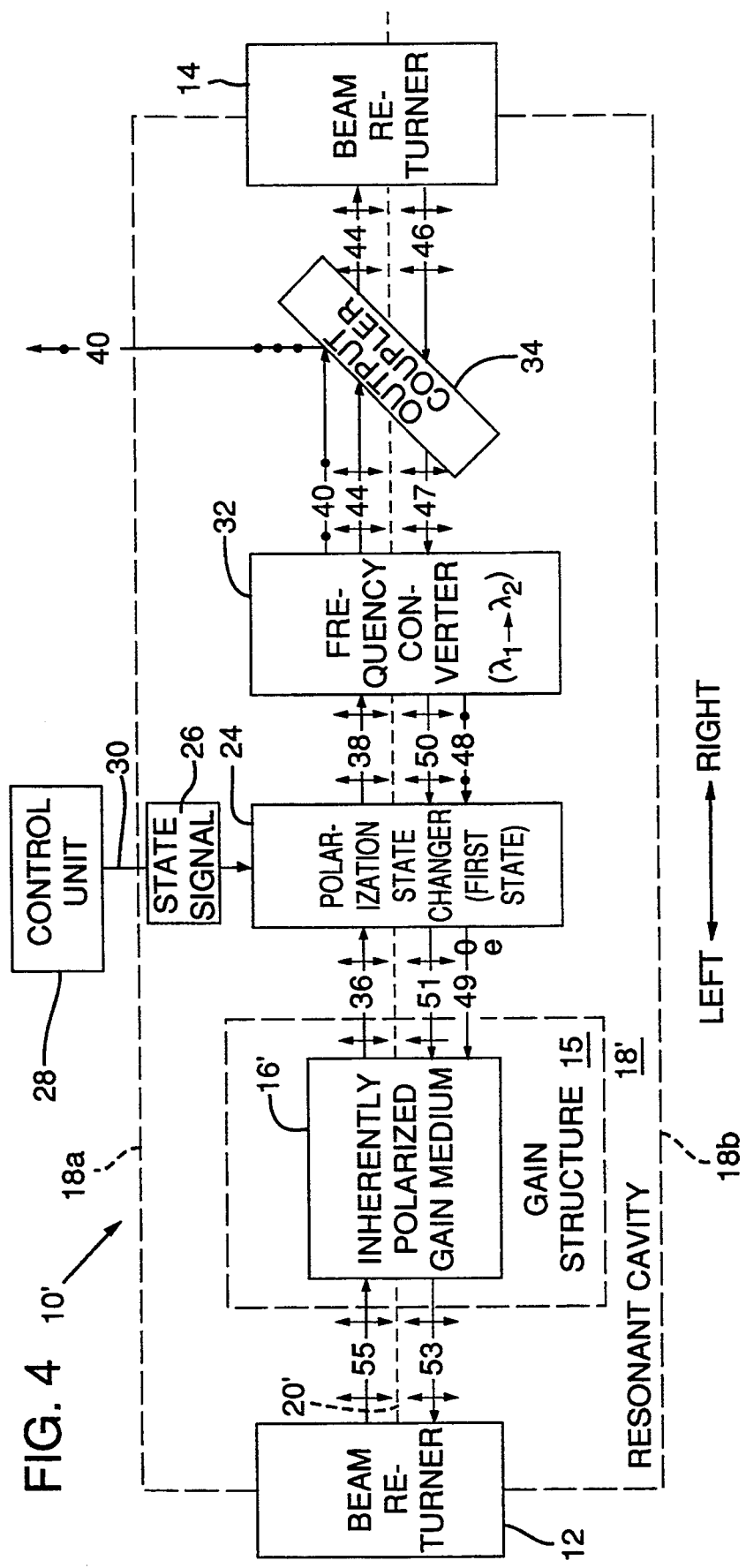
FIG. 4 depicts a second embodiment of the invention (also an intracavity configuration) in a first state in which beams exiting and a gain medium are of different wavelengths.
Figure 5:
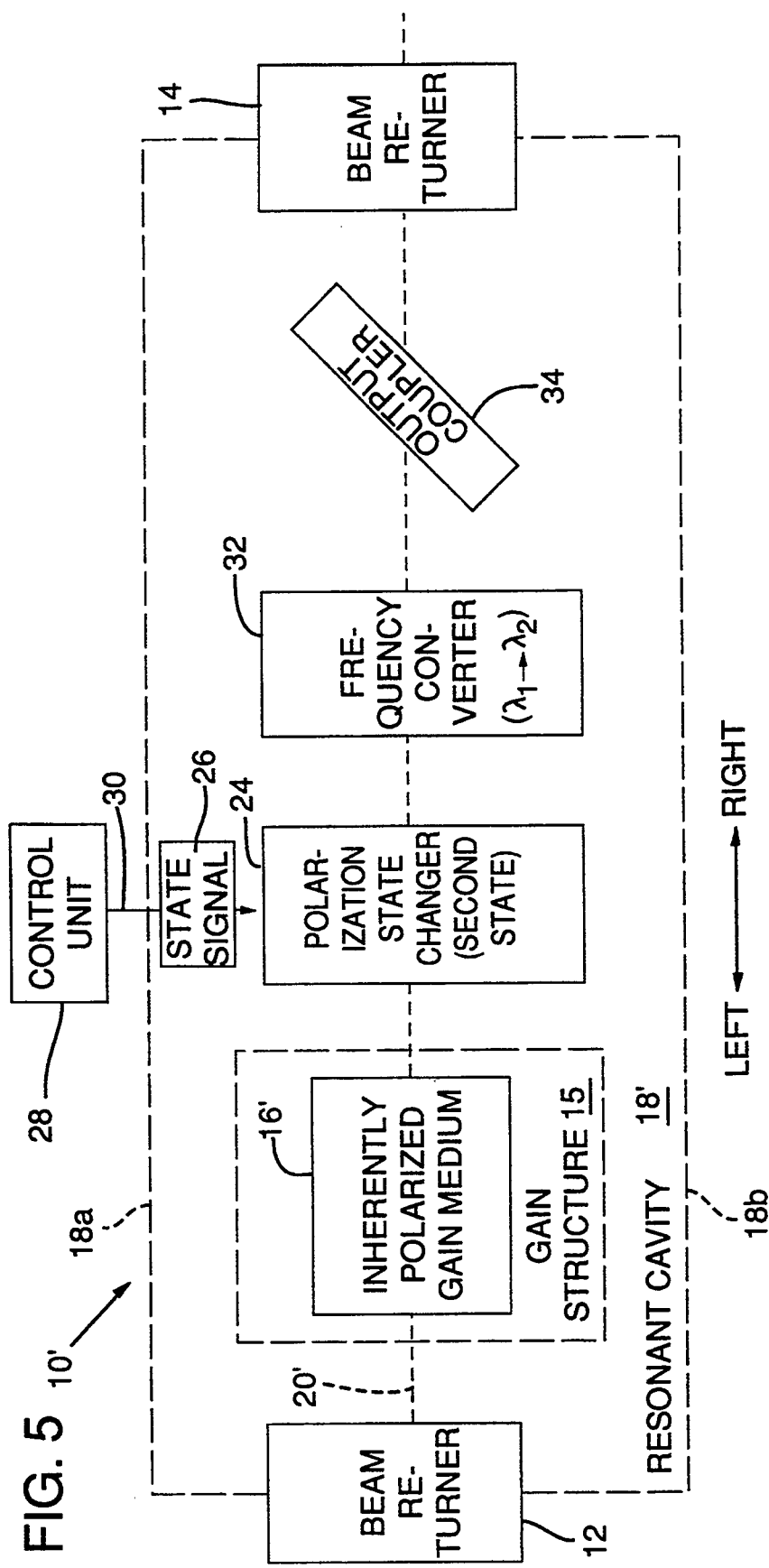
FIG. 5 shows the second embodiment of the invention in a second state that produces no laser output.
Figure 6:
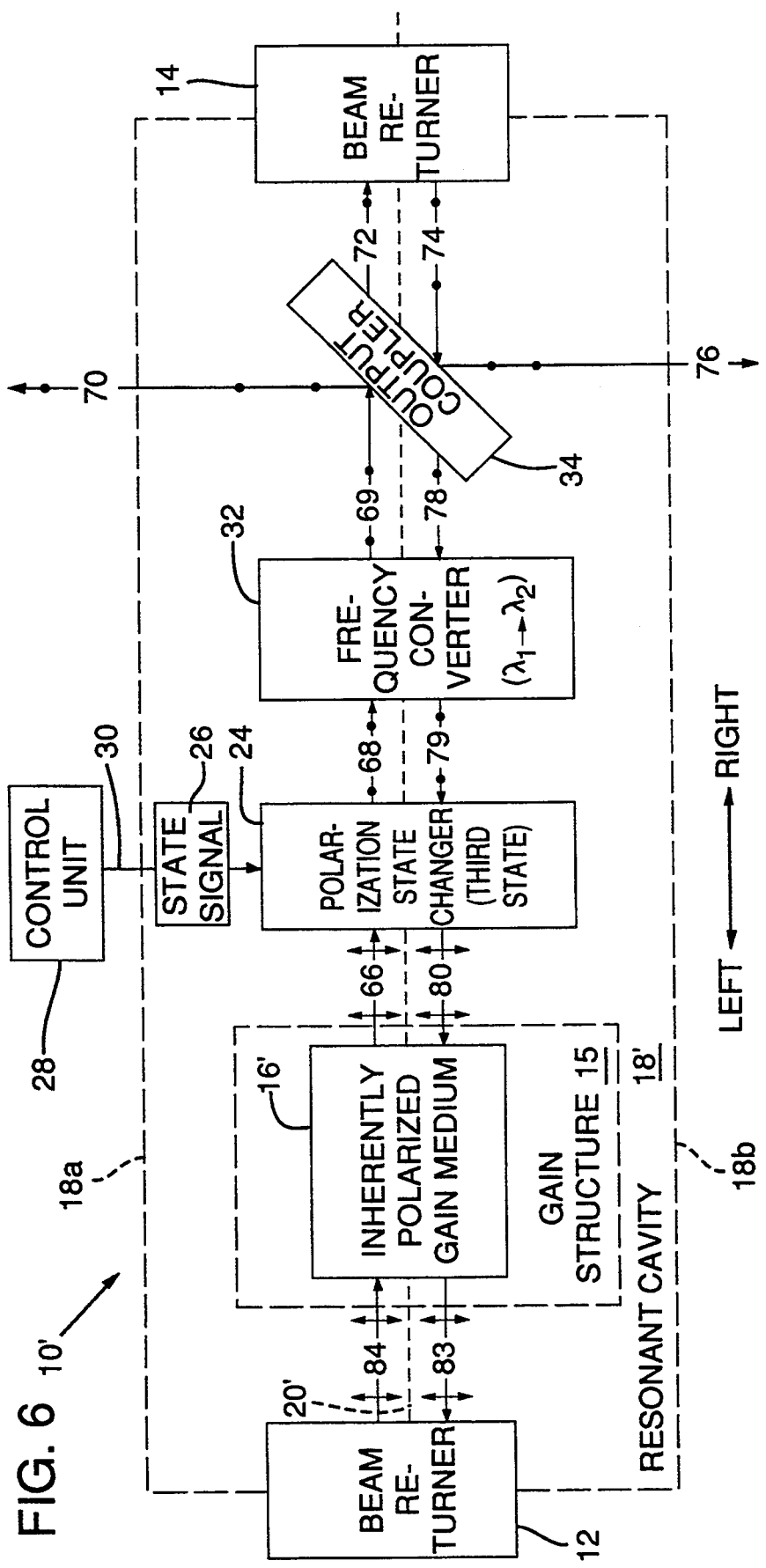
FIG. 6 shows the second embodiment of the invention in a third state in which beams exiting the output coupler and the gain medium are of the same wavelength.

Alternative wavelengths for gain medium 16 and alternative forms of gain structure 15 are possible; one such alternative form is the inherently polarized gain medium 16' shown in FIGS. 4-6. Although not shown, polarizing element 22 could also be located between gain medium 16 and a polarization state changer 24.

Figure 8:
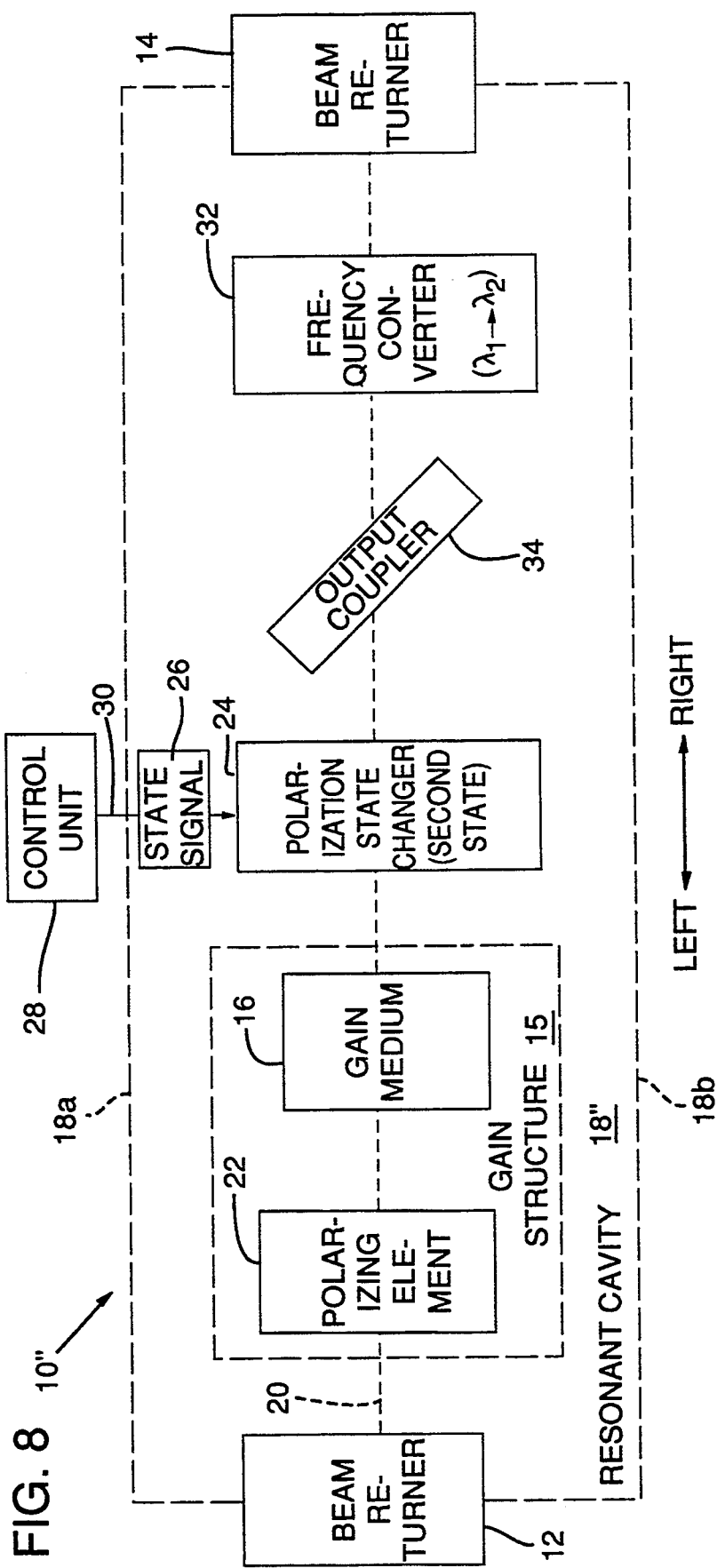
FIG. 8 shows the third embodiment of the invention in a second state that produces no laser output.

Referring again to FIG. 1, polarizing element 22 transmits only the vertically polarized component of the electromagnetic radiation. Polarization state changer 24 is disposed between gain structure 15 and second beam returner 14. Polarization state changer 24 retards one orthogonal component of incident electromagnetic radiation relative to the other orthogonal component. Polarization state changer 24 is preferably a Pockels cell, the operation of which is described in W. Koechner, *Solid-State Laser Engineering*, pp. 414–422 (2d ed.) (Berlin and New York: Springer-Verlag) ("Koechner"). When it operates as polarization state changer 24, the Pockels cell is oriented as shown in FIG. 8.11 on p. 416 of Koechner (where the Pockels cell is a material such as KDP operated with a longitudinal electric field) or as shown in FIGS. 8.13a-c on p. 420 of Koechner (where the Pockels cell is a material such as KDP or LiNbO$_3$ operated with a transverse electric field).

Because polarization state changer 24 is located inside cavity 18, the active material of the Pockels cell is preferably KD*P (potassium dideuterium phosphate, KD$_2$PO$_4$) due to its higher damage threshold. (Another possible active material is LiNbO$_3$ (lithium niobate), which has a lower voltage requirement but a lower damage threshold.)

Polarization state changer 24 could also be a rotatable half-wave plate (not shown) oriented with its optic axis in the plane perpendicular to lasing path 20 and rotatable about an axis parallel to lasing path 20. Further details concerning the use of a rotatable wave plate are given below in connection with FIGS. 13, 15A, and 15B and Eqs. C and D. A rotatable wave plate is, however, undesirable because of the slow speed of the mechanical motion required to rotate the plate.

Polarization state changer 24 is operable to cause a continuum of different phase delays between orthogonal components of an incident beam. For embodiments operated in an intracavity frequency conversion configuration, polarization state changer 24 is operated in one of three operative states in response to a state signal 26 generated by a control unit 28 and provided to polarization state changer 24 over a state signal path 30. Those operative states, together with their effects, are summarized below in Table I.

TABLE I

| Effect of Polarization State Changer 24 | |
|---|---|
| Operative State of Polarization State Changer 24 | Effect on Polarization State of Output Beam at $\lambda_1$ |
| First (FIGS. 1, 4, and 7) | Output beam has same polarization state as input beam. |
| Second (FIGS. 2, 5, and 8) | Output beam circularly polarized if input beam horizontally or vertically polarized. |
| Third (FIGS. 3, 6, and 9) | Output beam horizontally polarized if input beam vertically polarized; output beam vertically polarized if input beam horizontally polarized. |

Skilled persons will recognize that one specific example of the type of polarization state changer 24 described in Table I is one that retards one of two orthogonal polarization components of an incident beam at $\lambda_1$ by no amount when it is in its first state, by $\lambda_1/4$ when it is in its second state, and by $\lambda_1/2$ when it is in its third state.

As described below, when polarization state changer 24 is in its second operative state, laser 10 produces no laser emission. In the case in which polarization state changer 24 is only a Pockels cell, holding polarization state changer 24 in its second operative state typically requires an applied voltage.

For some applications it may be preferable not to have to apply a voltage in the state of polarization state changer 24 for which there is no laser output. One example of such a polarization state changer is illustrated in FIG. 1A. In FIG. 1A polarization state changer 24 includes a quarter-wave polarization state changer 24A having the same effect as a quarter-wave plate for beams at $\lambda_1$ and a Pockels cell 24B. Polarization state changer 24A imparts a phase delay equal or equivalent to $\lambda_1/4$ to beams at $\lambda_1$. Polarization state changer 24A makes the second operative state of the Pockels cell 24B the state which requires no applied voltage.

Table II summarizes the voltage required to place in the three operative states (a) Pockels cell 24B and (b) polarization state changer 24, including Pockels cell 24B and polarization state changer 24A.

TABLE II

| Operative States and Applied Voltages for Polarization State Changer 24 and a Pockels Cell 24B | |
|---|---|
| | Applied Voltage |
| (a) Operative State of Pockels Cell 24B if Used as Polarization State Changer 24 | |
| 1 | 0 |

TABLE II-continued

Operative States and Applied Voltages for
Polarization State Changer 24 and a Pockels Cell 24B

| | Applied Voltage |
|---|---|
| 2 | $V_{\lambda/4}$ |
| 3 | $V_{\lambda/2}$ |

(b)
Operative State of
Polarization State Changer 24
(FIG. 1A)

| | |
|---|---|
| 1 | $-V_{\lambda/4}$ |
| 2 | 0 |
| 3 | $V_{\lambda/4}$ |

Referring again to FIG. 1, a frequency converter 32 is disposed in laser cavity 18 and along lasing path 20 between polarization state changer 24 and second beam returner 14. Frequency converter 32 has the property of responding to an incident beam at $\lambda_1$ and predetermined polarization direction by converting a portion of the incident beam into a generated beam at $\lambda_2$. Because of the characteristics of the output couplers 34 (FIGS. 1-9), the embodiments shown in FIGS. 1-9 require that frequency converter 32 respond to a vertically polarized input beam at $\lambda_1$ by producing a horizontally polarized output beam at $\lambda_2$ propagating in the same direction as, and nearly collinearly with, the input beam at $\lambda_1$. That is the behavior of a Type I frequency doubler, for which $\lambda_2 = \lambda_1/2$.

Referring again to FIG. 1, an output coupler 34 is disposed in cavity 18 and on lasing path 20 between frequency converter 32 and second beam returner 14. Output coupler 34 couples beams out of cavity 18 according to the following characteristics:

TABLE III

Output Coupling of Output Coupler 34

| Wavelength of Incident Beam | Polarization State of Incident Beam | Output Coupling Efficiency |
|---|---|---|
| $\lambda_1$ | Vertical | Substantially Zero |
| $\lambda_1$ | Horizontal | Moderate |
| $\lambda_2$ | Vertical | Substantially Zero |
| $\lambda_2$ | Horizontal | Very High |

The "substantially zero" output coupling described in Table III is preferably zero but impracticable to achieve. The "moderate" output coupling for beams at $\lambda_1$ with horizontal polarization is a degree of coupling which successfully balances two competing considerations. The overall gain or Q of cavity 18 for laser action at $\lambda_1$ is reduced when some portion of beams at $\lambda_1$ is coupled out of cavity 18. Output coupler 34 should not couple out so much of the beams at $\lambda_1$ as to stop laser action in cavity 18 or to reduce unduly the intensity of laser action in cavity 18. However, output coupler 34 should couple enough of the beams at $\lambda_1$ out of cavity 18 to deliver the desired intensity of output beam at $\lambda_1$ from laser 10. The "very high" efficiency of output coupling for horizontally polarized beams at $\lambda_2$ is preferably over 80 percent.

The characteristics described in Table III are achieved by using as output coupler 34, for example, a multilayer dielectric mirror operated at the appropriate angle to lasing path 20. Skilled persons are able to specify for manufacture and/or to order such a mirror and to orient it at the proper angle to lasing path 20.

Referring again to FIG. 1, laser 10 operates in the following manner when polarization state changer 24 is in the first operative state.

Gain medium 16 produces in cavity 18 and along lasing path 20 a beam 36 at $\lambda_1$ travelling to the right as shown in FIG. 1. Polarizing element 22 prevents lasing action in cavity 18 except for vertically polarized beams.

Beam 36 impinges on polarization state changer 24, which in the first operative state has no effect on the polarization state of beam 36 (see Table I). The beam 36 accordingly passes through polarization state changer 24 and emerges as the vertically polarized beam 38.

Beam 38 then impinges on frequency converter 32, which is oriented in cavity 18 in proper relationship to the plane of vertical polarization. Frequency converter 32 converts part of the incident beam 38 into a beam 40 at $\lambda_2$ travelling along lasing path 20 to the right as shown in FIG. 1. In the preferred embodiment in which frequency converter 32 is a Type I cut frequency doubling crystal, beam 40 at $\lambda_2$ is horizontally polarized. The portion of beam 36 at $\lambda_1$ not converted by frequency converter 32 emerges as a vertically polarized beam 44.

Beams 44 and 40 then impinge on output coupler 34, which couples beam 40 at $\lambda_2$ out of cavity 18 but transmits beam 44 at $\lambda_1$ toward beam returner 14 (see Table III). Beam 40 at $\lambda_2$ remains horizontally polarized when coupled out of the cavity 18.

Beam returner 14 returns beam 44 as a vertically polarized left-travelling beam 46 at $\lambda_1$, which passes through output coupler 34 and emerges as a vertically polarized beam 47.

Beam 47 impinges on frequency converter 32 and there produces a horizontally polarized beam 48 at $\lambda_2$ travelling left along lasing path 20.

The portion of beam 47 not converted in frequency converter 32 emerges as a left-travelling vertically polarized beam 50 at $\lambda_1$. Beam 50 at $\lambda_1$ travels through polarization state changer 24 without change of polarization state (see Table III) and emerges as a beam 51, which then impinges on gain medium 16, where beam 51 is amplified by stimulated emission of radiation and emerges as beam 52. Beams 51 and 52 are vertically polarized. Gain medium 16 typically has some depolarizing effect on beam 51 (and, later, on a right-travelling beam 56), particularly if gain medium 16 is YAG. That depolarizing effect tends to reduce the Q of cavity 18 but is not otherwise significant to the discussion herein.

Beam 52 then impinges on polarizing element 22, through which it passes with unchanged polarization state to emerge as a beam 53. Beam 53 at $\lambda_1$ then impinges on beam returner 12 and is returned as a vertically polarized beam 55. The beam 55 then traverses polarizing element 22 without change of polarization state to emerge as a beam 56 that enters gain medium 16, where it is amplified by stimulated emission of radiation and emerges to become part of the right-travelling vertically polarized beam 36 at $\lambda_1$.

On leaving frequency converter 32 left-travelling beam 48 at $\lambda_2$ is horizontally polarized.

The effect of the polarization state changer 24 on a beam at $\lambda_2$ depends on the material from which it is made. That effect, in general, can be summarized as converting the horizontally polarized beam 48 at $\lambda_2$ into an elliptically polarized beam 49 at $\lambda_2$.

However, left-travelling beam 49 at $\lambda_2$ typically undergoes considerable attenuation when passing through gain medium 16, particularly when it is YAG. Skilled persons will appreciate that beam 49 at $\lambda_2$ is, after passing through gain medium 16, substantially attenuated. Beam 49 at $\lambda_2$ is accordingly disregarded in this discussion.

The total energy extracted from beams 38 and 47 to form the respective beams 40 and 48 in frequency converter 32 is not so large as to prevent lasing action at $\lambda_1$ in cavity 18. Laser 10 depicted in FIG. 1 thus produces a continuous-wave output beam 40 at $\lambda_2$ when there is continuous pumping of gain medium 16.

Figure 3:
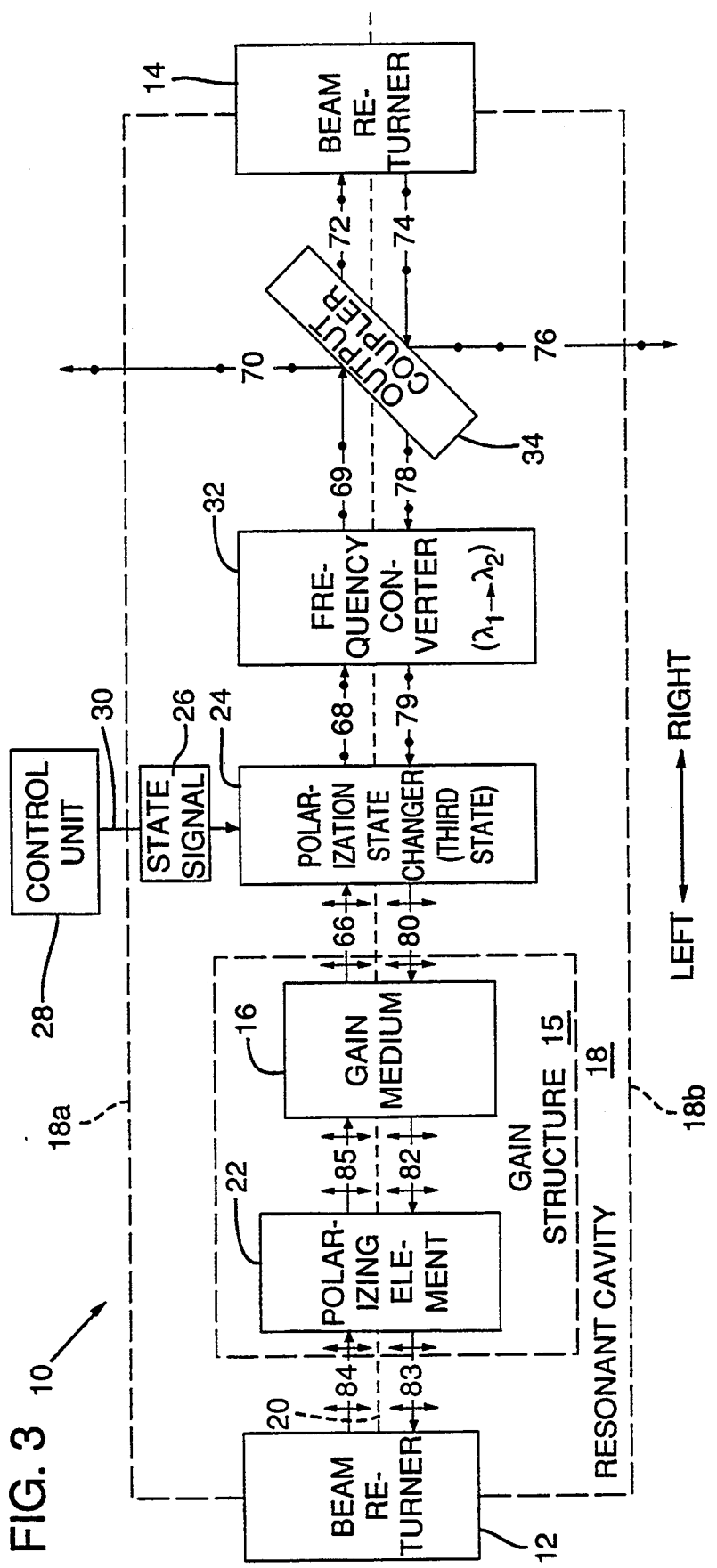
FIG. 3 shows the first embodiment of the invention in a third state in which beams exiting the output coupler and the gain medium are of the same wavelength.

FIGS. 2 and 3 show the operation of laser 10 depicted in FIG. 1 in the states in which polarization state changer 24 is in its respective second and third operative states.

Referring to FIG. 2, control unit 28 produces STATE SIGNAL 26 so as to cause polarization state changer 24 to assume its second operative state. As a consequence, the Q factor of cavity 18 is sufficiently reduced such that its net gain becomes less than unity. With such a reduced net gain cavity 18 does not support lasing, gain structure 15 emits no beam at $\lambda_1$, and no beam impinges on frequency converter 32. Thus, frequency converter 32 produces no beam at $\lambda_2$. Because there is no output of a beam at either $\lambda_1$ or $\lambda_2$, the energy pumped into gain medium 16 while polarization state changer 24 is in its second operative state causes a population inversion accumulation in gain medium 16.

FIG. 3 depicts the operation of laser 10 when polarization state changer 24 is in its third operative state. In FIG. 3, a vertically polarized beam 66 at $\lambda_1$ emerges from gain medium 16 and impinges on polarization state changer 24. As indicated in Table I, a horizontally polarized beam 68 at $\lambda_1$ emerges from polarization state changer 24.

As described above, frequency converter 32 is aligned with respect to lasing path 20 so that it generates an output beam at $\lambda_2$ only when an input beam at $\lambda_1$ is vertically polarized. Thus, when horizontally polarized beam 68 impinges on frequency converter 32, it produces no output beam at $\lambda_2$ but transmits beam 68 as a horizontally polarized beam 69 at $\lambda_1$.

Beam 69 then impinges on output coupler 34. As indicated in Table III, output coupler 34 couples a moderate portion of the energy in beam 69 out of cavity 18 as an output beam 70. Output coupler 34 transmits the remainder of beam 68 to the right in FIG. 3 as beam 72. Beam 72 impinges on and is returned by second beam returner 14 as a horizontally polarized beam 74.

The left-travelling beam 74 impinges on output coupler 34, where a portion 76 of beam 74 is coupled out of cavity 18, and the remainder 78 of beam 74 continues travelling to the left. Beams 76 and 78 are horizontally polarized.

The horizontally polarized beam 78 then impinges on and passes through frequency converter 32 without producing a beam at $\lambda_2$ and emerges as a horizontally polarized beam 79. Beam 79 then impinges on, passes through, and emerges from polarization state changer 24 as a vertically polarized beam 80. Beam 80 then passes into and is amplified in gain medium 16, from which a vertically polarized amplified beam 82 emerges. Beam 82 passes through polarizing element 22 to emerge as a vertically polarized beam 83, impinges on beam returner 12, and is returned as a right-travelling vertically polarized beam 84. Beam 84 passes through polarizing element 22 and emerges as a vertically polarized beam 85, which then impinges on gain medium 16, from which it emerges to form beam 66.

With polarization state changer 24 in its third operative state, laser 10 has horizontally polarized output beams 70 and 76 at $\lambda_1$. The energy output at $\lambda_1$ is not so high as to stop lasing action in gain medium 16. Thus, laser 10 can provide continuous-wave output at $\lambda_1$ with polarization state changer 24 in its third operative state and with continuous pumping of gain medium 16.

Laser 10 can also produce a Q-switched output pulse of a linearly polarized beam at $\lambda_2$. First, control unit 28 holds STATE SIGNAL 26 so that laser 10 is operated with polarization state changer 24 in its second operative state (see FIG. 2 and its description) for long enough to build up a desired extent of population inversion accumulation in gain medium 16. The desired degree of population inversion accumulation corresponds to the desired intensity of the Q-switched output pulse. Then control unit 28 changes STATE SIGNAL 26 so that polarization state changer 24 changes from its second operative state to its first operative state (see FIG. 1 and its description), with the result that laser 10 generates a Q-switched output pulse at $\lambda_2$ until the energy stored in the population inversion accumulation has discharged from laser 10. Alternatively, polarization state changer 24 is then changed to its second operative state to again build up a population inversion accumulation (see FIG. 2 and its description) to make laser 10 ready for the next Q-switched laser pulse operation.

Laser 10 can also produce a Q-switched output pulse of a linearly polarized beam at $\lambda_1$. First, control unit 28 holds STATE SIGNAL 26 so that laser 10 is operated with polarization state changer 24 in its second operative state, as described in the preceding paragraph. Then control unit 28 changes polarization state changer 24 from its second operative state to its third operative state (see FIG. 3 and its description), with the result that laser 10 generates a Q-switched output pulse at $\lambda_1$ until the energy stored in the population inversion accumulation has discharged from laser 10. Polarization state changer 24 is then changed to its second operative state (see FIG. 2 and its description) to again build up a population inversion accumulation.

A second preferred embodiment of the invention uses a gain medium which produces an inherently linearly polarized beam. Nd:YLF is one example of such a gain medium.

FIGS. 4–6 show the second preferred embodiment of the invention. FIGS. 4–6 correspond generally to FIGS. 1–3, respectively, except that in FIGS. 4–6 polarizing element 22 is not present as a separate element and gain medium 16 of FIGS. 1–3 is replaced by the inherently linearly polarized gain medium 16'. Thus, in FIGS. 4–6 gain structure 15 contains the inherently linearly polarized gain medium 16'.

The output of gain medium 16' in laser 10' is thus inherently vertically polarized. In addition, the characteristics of gain medium 16' are that only a vertically polarized beam will pass through gain medium 16' without substantial attenuation.

Skilled persons will appreciate that the descriptions of the operation of laser 10 given in connection with FIGS. 1–3 transfer directly to the operation of laser 10' depicted in FIGS. 4–6; the preceding discussion with respect to items having unprimed reference numerals transfers directly to corresponding items with reference numerals followed by primes. Thus, there is no need to repeat in connection with FIGS. 4–6 the description already given in connection with FIGS. 1–3.

Figure 7:
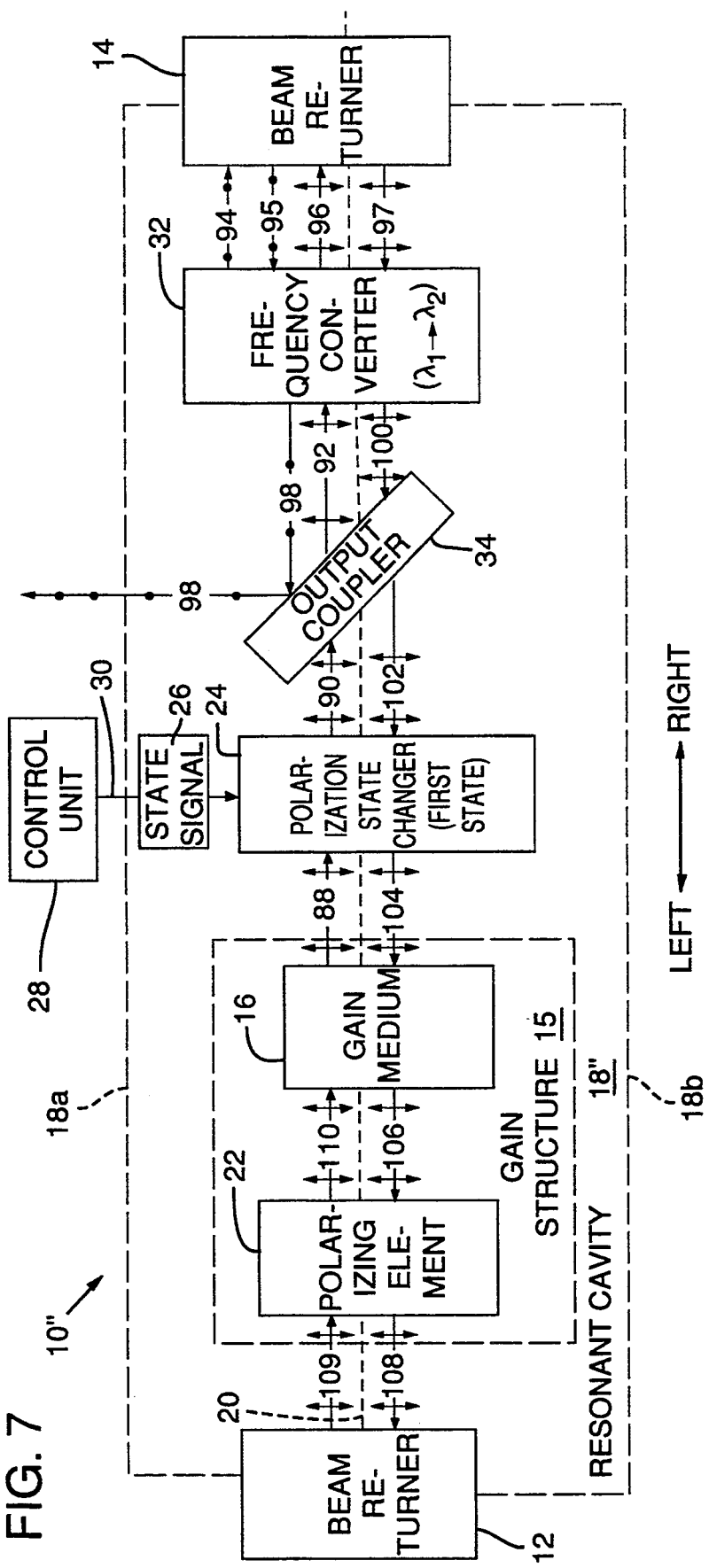
FIG. 7 Shows a third embodiment of the invention (also an intracavity configuration) which is configured so that the output coupler is located to maximize the power in the beam at the second wavelength and is in a first state in which beams exiting the output coupler and the gain medium are of different wavelengths.

FIGS. 7–9 depict a third preferred embodiment of the invention, shown as laser 10", which is the same as laser 10 of FIGS. 1, 2, and 3 except that positions of frequency converter 32 and output coupler 34 are exchanged in laser 10" as compared with their positions in laser 10 of FIGS. 1, 2, and 3. Items which bear the same reference numerals in FIGS. 7–9 as in FIGS. 1–3 are identical. Cavity 18" of FIGS. 7–9 is substantially identical to cavity 18 of FIGS. 1–3. FIGS. 7, 8, and 9 show laser 10" with polarization state changer 24 in its first, second, and third operative states, respectively.

Referring to FIG. 7, a vertically polarized beam 88 at $\lambda_1$ is emitted from gain medium 16. Polarization state changer 24 is in its first operative state; therefore, beam 88 passes through polarization state changer 24 and emerges as a beam 90 with unchanged polarization state.

Beam 90 passes through output coupler 34 and emerges as a beam 92 without change of polarization state (see Table III). Beam 92 then impinges on frequency converter 32, where a portion of beam 92 is converted into a horizontally polarized beam 94 at $\lambda_2$. The portion of beam 92 not so converted emerges from frequency converter 32 as vertically polarized beam 96 at $\lambda_1$. Beams 94 and 96 are returned by beam returner 14 as beams 95 and 97, respectively, without change of polarization state.

When left-travelling beam 97 at $\lambda_1$ passes through frequency converter 32, a portion of that beam generates a new horizontally polarized beam at $\lambda_2$ that combines with left-travelling horizontally polarized beam 95 at $\lambda_2$ to emerge from frequency converter 32 as a combined horizontally polarized beam 98. Beam 98 at $\lambda_2$ strikes output coupler 34 and is coupled out of cavity 18" (see Table III). The positions of frequency converter 32 and output coupler 34 may need to be adjusted to prevent destructive interference between beam 95 at $\lambda_2$ and the beam at $\lambda_2$ generated in frequency converter 32 from left-travelling beam 97 at $\lambda_1$. A related issue is described at pp. 506–507 of Koechner.

The portion of beam 97 at $\lambda_1$ not converted into a beam at $\lambda_2$ emerges from frequency converter 32 as a vertically polarized beam 100 at $\lambda_1$. Beam 100 passes through output coupler 34 (see Table III) and emerges as a vertically polarized beam 102 at $\lambda_1$. Beam 102 successively gives rise to vertically polarized beams 104, 106, 108, 109, and 110, as described in connection with beams 50, 51, 52, 53, 55, and 56 in FIG. 1. Beam 110 combines in gain medium 16 with other stimulated emissions, all of which emerge as vertically polarized beam 88 at $\lambda_1$.

Laser 10" of FIG. 7 is preferable to laser 10 of FIGS. 1–3 because laser 10" uses beams at $\lambda_2$ generated by right-travelling beam 92 at $\lambda_1$ and by left-travelling beam 97 at $\lambda_1$. Referring to FIG. 1, laser 10 uses only beam 40 at $\lambda_2$ generated by right-travelling beam 38 at $\lambda_1$. Laser 10" thus generates a more intense output beam at $\lambda_2$ than does laser 10.

FIG. 8 shows laser 10" of FIG. 7 with polarization state changer 24 in its second operative state. For the same reasons as given in connection with FIG. 2, laser 10" of FIG. 8 produces no laser emission with polarization state changer 24 in its second operative state.

FIG. 9 shows laser 10" of FIGS. 7 and 8 with polarization state changer 24 in its third operative state. A vertically polarized beam 112 at $\lambda_1$ emerges from gain medium 16 for the same reasons as given in connection with FIGS. 1 and 3.

Beam 112 passes through polarization state changer 24 and emerges as a horizontally polarized beam 114 (see Table I). Beam 114 passes through output coupler 34 and emerges as beam 116 without change of polarization state. Beam 116 passes through frequency converter 32 without being converted into any beam at $\lambda_2$ and emerges as beam 118 without change of polarization state. Beam 118 is returned at beam returner 14 as a horizontally polarized beam 119 at $\lambda_1$, which impinges on frequency converter 32 and emerges from it as a horizontally polarized beam 120. Beam 120 impinges on output coupler 34. At output coupler 34 a portion of beam 120 is coupled out of cavity 18 as a beam 122 at $\lambda_1$ without change of polarization state (see Table III). The remainder of beam 120 passes through output coupler 34 and emerges as a horizontally polarized beam 124 that impinges on polarization state changer 24, from which it emerges as a vertically polarized beam 126 (see Table I) that gives rise to vertically polarized beams 128, 130, 131, and 132. Beam 132 combines with stimulated emissions in gain medium 16 to produce beam 112.

Laser 10" of FIGS. 7–9 is operable in the same way as laser 10 of FIGS. 1–3 to produce Q-switched and/or continuous-wave output at $\lambda_1$ or $\lambda_2$.

FIGS. 10–13 depict a fourth preferred embodiment of the invention in which frequency conversion under the control of a polarization state changer takes place outside a laser cavity.

Figure 10:
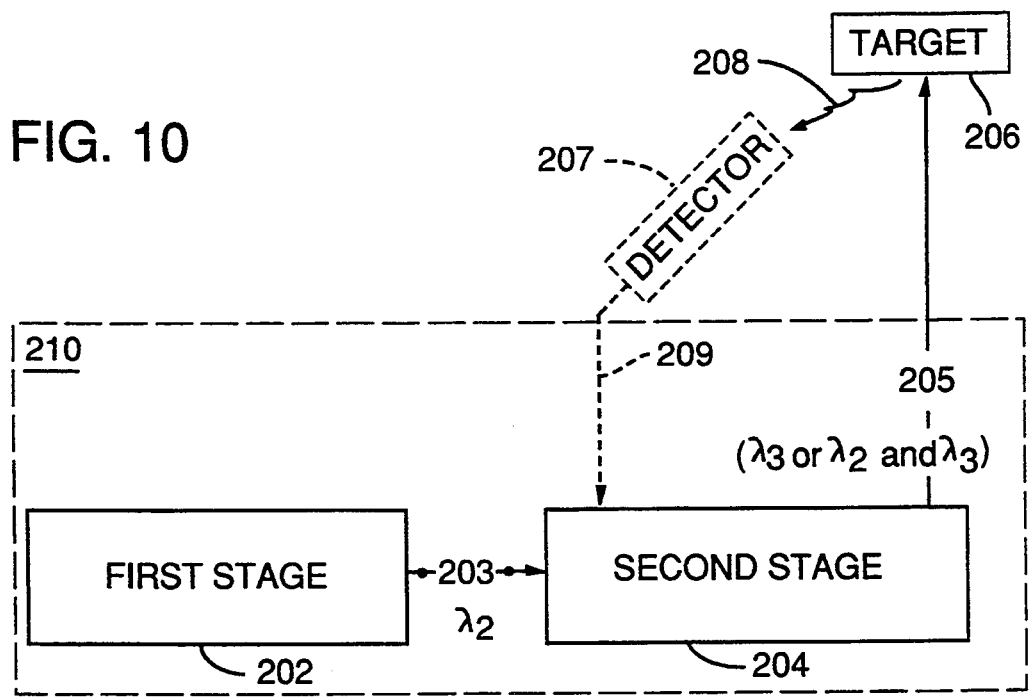
FIG. 10 shows a simplified block diagram of a fourth embodiment of the invention (an extracavity configuration).

FIG. 10 depicts the fourth embodiment of the invention, shown as a laser system 210 that includes a first stage 202, a second stage 204, and an optional detector 207. First stage 202 generates a linearly polarized beam 203 at $\lambda_2$. For convenience, beam 203 is referred to as horizontally polarized. Second stage 204 generates a beam 205 which may include a beam at $\lambda_3$ or a beam at $\lambda_3$ with a beam at $\lambda_2$. The beam 205 is directed at and interacts with a surface or a volume of a target 206, which may be a gas, a liquid, and/or a solid (such as a workpiece). The (optional) detector 207 detects an indication 208 of the condition of target 206 and communicates information about indication 208 to second stage 204 over an (optional) information path 209. For example, indication 208 is electromagnetic radiation reflected, scattered, emitted, transmitted, or otherwise coming from target 206; detector 207 includes a photodiode responsive to the electromagnetic radiation; and the information about the detected electromagnetic radiation is an electrical signal conveyed over a signal line 209 to second stage 204.

Logic within second stage 204 controls the composition of beam 205 and receives and responds to any signal from (optional) detector 207.

First stage 202 could be any laser with a linearly polarized output at $\lambda_2$. It could be Q-switched or not Q-switched, and pulsed or continuous-wave operated. It could be a laser with an unpolarized output beam at $\lambda_2$, followed by a polarizer.

Figure 11:
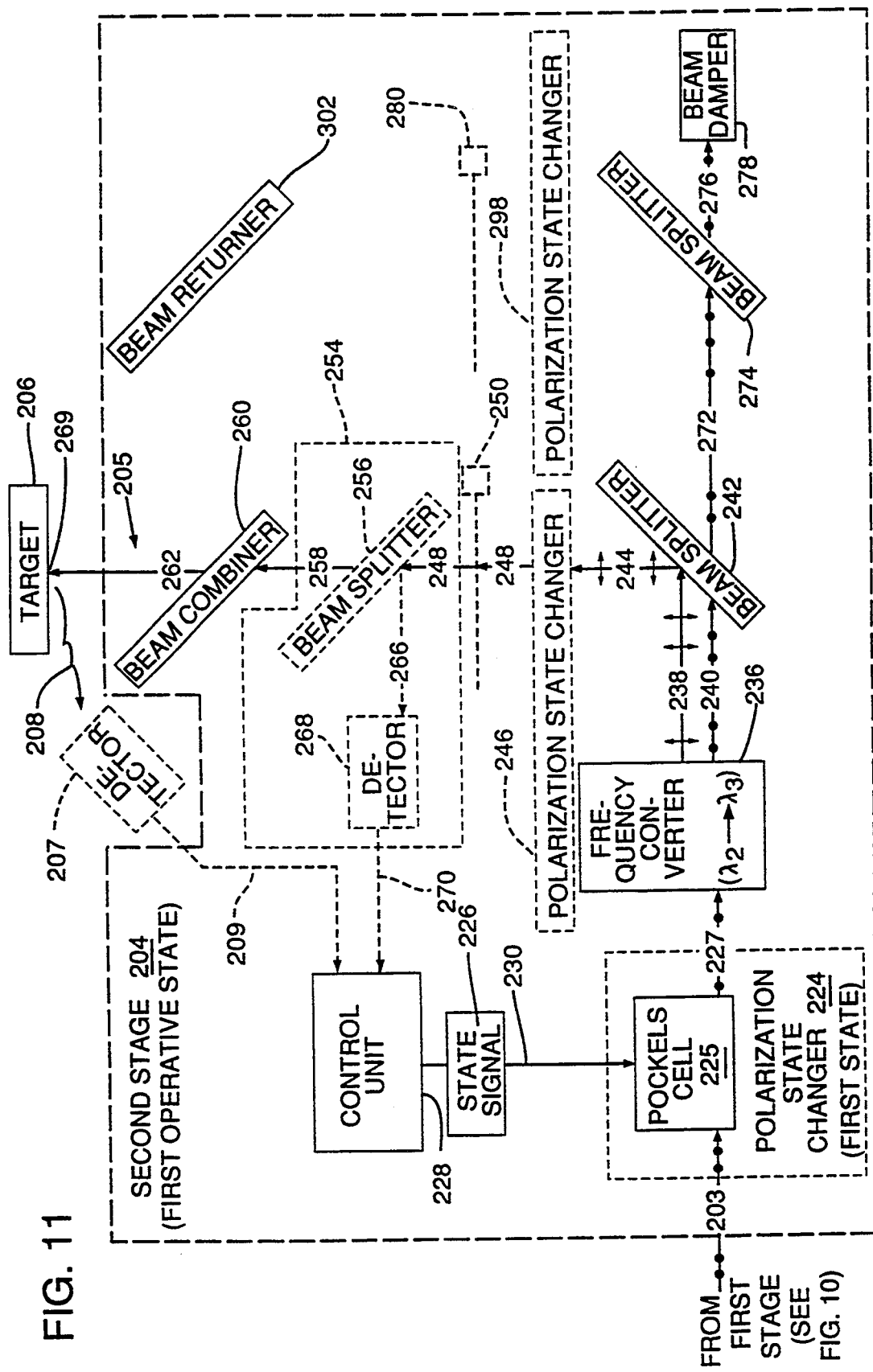
FIG. 11 shows the second stage of the fourth embodiment of FIG. 10 in a first operative state in which beams exiting the first and second stages are of different wavelengths.
Figure 12:
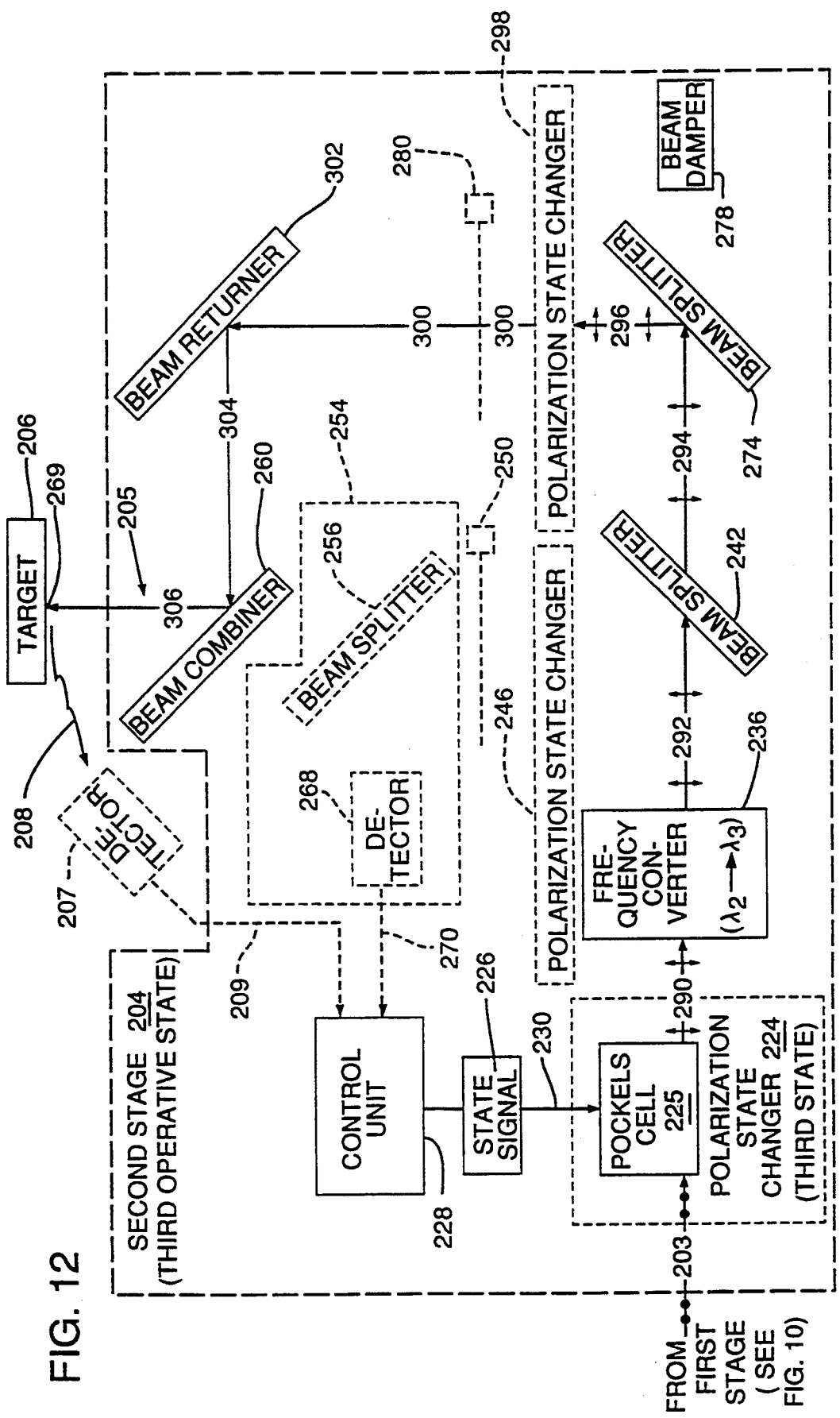
FIG. 12 shows the second stage of the fourth embodiment of FIG. 10 in a third operative state in which beams exiting the first and second stages are of the same wavelength.
Figure 13:
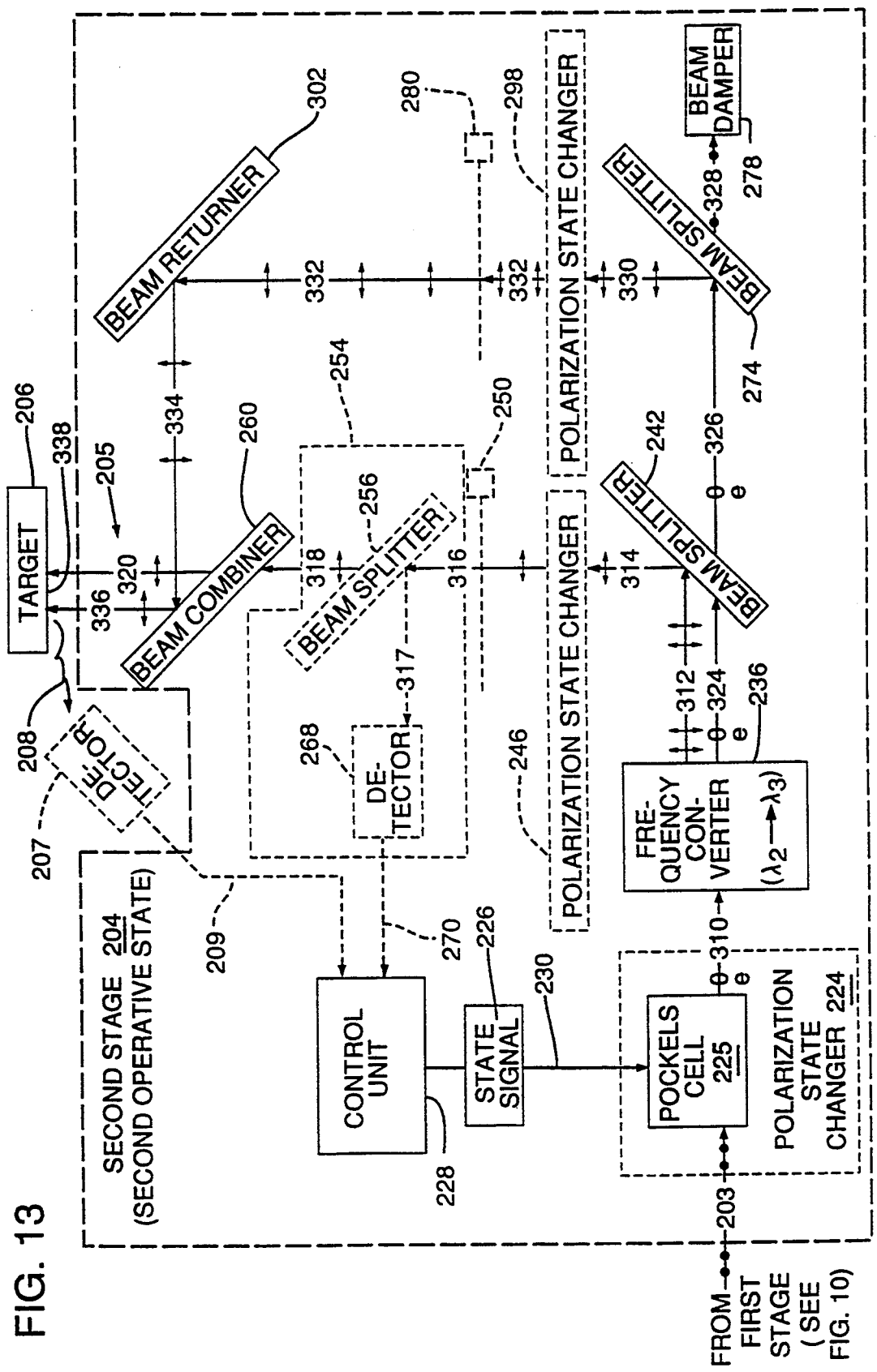
FIG. 13 shows the second stage of the fourth embodiment of FIG. 10 in a second operative state in which the beam exiting the second stage is a mixture of a beam exiting the first stage at a particular wavelength and a beam at a different wavelength.

FIGS. 11–13 depict second stage 204, which is operable with a polarization state changer 224 in any state.

The laser system 210 is operable in either of the first and the third operative states of the polarization state changer 224, as shown in FIGS. 11–12. FIG. 11 is a more detailed view of second stage 204 of FIG. 16 when second stage 204 is in the first operative state.

Referring to FIG. 11, horizontally polarized beam 203 at $\lambda_2$ impinges on polarization state changer 224, which has the same properties as those described above in connection with polarization state changer 24, except that the former operates with respect to a beam at $\lambda_2$. Polarization state changer 224 may be a Pockels cell 225 (as shown in FIG. 11) or a liquid crystal device or a rotatable wave plate (neither shown in FIG. 11), responsive to a STATE SIGNAL 226 applied by a control unit 228 over a signal path 230 to vary the degree to which orthogonal components of beam 203 are delayed relative to each other.

Because Pockels cell 225 is positioned outside any laser cavity, LiNbO$_3$ (lithium niobate) is preferably used as the operative Pockels cell material. In the LiNbO$_3$ polarization state changer an electric field is preferably applied in a direction transverse to the propagation direction of beam 203. By choosing an appropriate ratio of height to length of LiNbO$_3$, the required voltage to change the LiNbO$_3$ between its first operative state and its third operative state (see Table IV) can be as low as a few hundred volts, as compared with 6-12 kilovolts required to change a KD*P Pockels cell between its first and third operative states (see Tables I and II and accompanying discussion).

STATE SIGNAL 226 has first and third operative states (similar to the first and third operative states of FIGS. 1, 3, 4, 6, 7, and 9) that have the effects summarized in the following Table IV:

TABLE IV

Effect of Polarization State Changer 224 - Extracavity Configuration

| Operative State of Polarization State Changer 224 | Effect on Polarization State of Output Beam 227 at the Second Wavelength $\lambda_2$ |
|---|---|
| First (FIG. 11) | Output beam 227 has same polarization state as input beam 203 |
| Third (FIG. 12) | Output beam 227 vertically polarized if input beam 203 horizontally polarized |

As described above in connection with FIG. 1A and Table II, in FIGS. 11-13, when polarization state changer 224 includes a Pockels cell 225, the polarization state changer 224 may also include a quarter-wave polarization state changer (not shown in FIGS. 11-13) so that polarization state changer 224 will be in its second operative state when STATE SIGNAL 226 is an applied voltage of zero volts and so that the first and third states are produced by STATE SIGNALS 226 of equal magnitude but opposite polarity.

Referring again to FIG. 11, when polarization state changer 224 is in its first operative state, the horizontally polarized beam 203 at $\lambda_2$ impinges on polarization state changer 224 and emerges as a horizontally polarized beam 227 at $\lambda_2$.

The beam 227 then impinges on a frequency converter 236, which has the property that it converts a portion of a horizontally polarized incident beam at $\lambda_2$ into a vertically polarized beam 238 at $\lambda_3$. Frequency converter 236 is preferably a Type I cut crystal (e.g., BBO or LBO). A horizontally polarized beam 240 at $\lambda_2$ also emerges from frequency converter 236. Beam 240 is the portion of beam 227 not converted in frequency converter 236 to beam 238 at $\lambda_3$.

Beams 238 at $\lambda_3$ and 240 at $\lambda_2$ impinge on a beamsplitter 242, which is highly reflective of beams at $\lambda_3$ and highly transmissive of beams at $\lambda_2$. In a preferred embodiment beamsplitter 242 is oriented at a 45 degree angle to the path of beams 238 and 240. Beam 238 thus reflects as a vertically polarized beam 244 at $\lambda_3$. If it is desired to change the polarization state of beam 244, beam 244 may be passed through an (optional) polarization state changer 246 arranged to effect the desired change of polarization states. The (optional) polarization state changer 246 may be a quarter-wave polarization state changer at $\lambda_3$ or a variable polarization state changer under operative control (not shown) of control unit 228. Beam 244 at $\lambda_3$ emerges from (optional) polarization state changer 246 as a beam 248 and passes an (optional) shutter 250, which is operable manually or in response to a control (not shown) such as from control unit 228 to block the path of beam 248.

If (optional) shutter 250 is open, beam 248 at $\lambda_3$ passes through it and impinges on an (optional) intensity-detection system 254, which has a beamsplitter 256 slightly reflective, and highly transmissive, of beams at $\lambda_3$.

The portion of beam 248 transmitted by beamsplitter 256 emerges from it as a beam 258 at $\lambda_3$ and travels to a beam combiner 260, which is highly transmissive of beams at $\lambda_3$ but highly reflective of beams at $\lambda_2$. Beam 258 passes through beam combiner 260 and emerges as a beam 262 at $\lambda_3$ of the overall output beam 205.

In each of FIGS. 10-13, beam 205 is directed by appropriate optical and/or mechanical elements (not shown), and/or target 206 is moved mechanically, so that beam 205 impinges on a desired surface or in a desired volume of target 206.

Referring again to FIG. 11, the portion of beam 248 at $\lambda_3$ reflected by beamsplitter 256 travels as beam 266 at $\lambda_3$ to a detector 268, which is responsive to beam 266 to produce in its signal path 270 an indication of the intensity of beam 266. For example, detector 268 may be a photodiode that responds to and produces a voltage on a signal path 270 indicative of the intensity of beam 226 at $\lambda_3$. Control unit 228 may respond to the indication on signal path 270 by changing STATE SIGNAL 226 (as examples, by changing STATE SIGNAL to maintain the indication at a predetermined value or to carry out the "initial pulse" power control described below).

Indication 208 of the condition of target 206 is conveyed over (optional) information path 209 to control unit 228. For example, information 208 is electromagnetic radiation reflected, scattered, transmitted, or otherwise generated by an area or volume 269 where beam 205 strikes target 206; detector 207 (such as a photodiode) responds to produce a signal indicative of radiation 208; and signal path 209 conveys to control unit 228 the signal produced by detector 207.

Continuing to refer to FIG. 11, beam 240 at $\lambda_2$ passes through beamsplitter 242 and emerges as a beam 272 at $\lambda_2$ without change of polarization state. Beam 272 impinges on a polarizing beamsplitter 274 that has the characteristic of being highly transmissive of horizontally polarized beams at $\lambda_2$ and highly reflective of vertically polarized beams at $\lambda_2$. The horizontally polarized beam 272 emerges as a beam 276 at $\lambda_2$ and is absorbed in a beam damper 278. Thus, in the first operative state shown in FIG. 11, output beam 205 comprises only beam 262 at $\lambda_3$.

FIG. 12 shows second stage 204 of laser system 210 in its third operative state. In this third operative state, beam 203 at $\lambda_2$ emerges from polarization state changer 224 as a vertically polarized beam 290 at $\lambda_2$. Beam 290 impinges on frequency converter 236, which does not convert any portion of beam 290 into a beam at $\lambda_3$.

Beam 290 at $\lambda_2$ accordingly passes through frequency converter 236 without significant reduction in intensity and without change in polarization state and emerges as beam 292 at $\lambda_2$. Beam 292 then passes through beamsplitter 242 without change of polarization state and emerges as a beam 294 at $\lambda_2$ that is substantially entirely reflected at polarizing beamsplitter 274 without change in polarization state and continues as beam 296 at $\lambda_2$.

If it is desired to change the polarization state of beam 296, beam 296 may be passed through an (optional) polarization state changer 298 arranged to effect the desired change of polarization states. The (optional) polarization state changer 298 may be a quarter-wave polarization state changer at $\lambda_2$ or a variable polarization state changer under operative control (not shown) of control unit 228. Beam 296 at $\lambda_2$ emerges from (optional) polarization state changer 298 as a beam 300 at $\lambda_2$ and passes an (optional) shutter 280, which is operable manually or in response to a control (not shown) such as from control unit 228 to block the path of beam 300.

If (optional) shutter 280 is open, beam 300 passes through it, reflects at beam returner 302 without change of polarization state, and travels as a beam 304 at $\lambda_2$ to beam combiner 260. Beam returner 302 is highly reflective of beams at $\lambda_2$ incident to it at a 45 degree angle, and beam returner 302 is oriented at a 45 degree angle to the path of beam 300. At beam combiner 260, beam 304 reflects without change of polarization state and becomes a component beam 306 at $\lambda_2$ of output beam 205.

As was the case in FIG. 11 with component beam 62 of output beam 205, in FIG. 12, the only component beam 306 at $\lambda_2$ of output beam 205 is directed toward target 206 by optical and/or mechanical components (not shown in FIGS. 10–13) and/or target 206 is moved mechanically, so that beam 205 impinges on desired surface or volume 269 of target 206.

FIGS. 11 and 12 thus illustrate how laser system 210 may be operated like the first and third operative states of the laser systems of FIGS. 1, 3, 4, 6, 7, and 9. Laser system 210 of FIGS. 11 and 12 provides the following advantages in comparison with the lasers of FIGS. 1–9:

(1) Polarization state changer 224 and frequency converter 236 are outside the laser cavity of first stage 202; this provides flexibility to use frequency conversion techniques (such as optical parametric oscillation, frequency tripling, and frequency mixing) other than frequency doubling. If the laser of first stage 202 is operating at its fundamental wavelength, the absence of frequency converter 236 and polarization state changer 224 within the laser cavity of first stage 202 makes the first stage laser itself very simple, thereby providing much better operation and stability.

(2) If first stage 202 itself is operating at a second harmonic, its output wavelength is $\lambda_2$, for example. Then by using frequency converter 236 and polarization state changer 224, laser system 210 may operate at a $\lambda_3$ that is not reachable with a purely intracavity approach.

However, the extracavity laser system 210 of FIGS. 11–12 has the disadvantage (in comparison with the intracavity laser systems of FIGS. 1–9) of having much lower conversion efficiency because the laser beam circulating intensity within resonant cavity 18, 18', or 18" of FIGS. 1–9 is much higher than that outside the resonant cavity of first stage 202 of FIGS. 10–12.

Laser system 210 of FIGS. 10–13 has the further advantage over the lasers of FIGS. 1–9 in that it is readily operable with the polarization state changer 224 in any state intermediate between the first and third operative states.

FIG. 13 illustrates laser system 210 as it is operated in an extracavity configuration. In FIG. 13, as in FIGS. 10–12, beam 203 at $\lambda_2$ incident to polarization state changer 224 is horizontally polarized. When polarization state changer 224 is in states between the first and third operative states, a beam 310 at $\lambda_2$ into which polarization state changer 224 converts beam 203 will be in an elliptically polarized state, as shown by the symbols at beam 310.

Elliptically polarized beam 310 at $\lambda_2$ is resolvable into a linear combination of horizontal and vertical polarization components. When beam 310 impinges on frequency converter 236, the power in beam 312 at wavelength $\lambda_3$ generated in frequency converter 236 is determined by the power in the horizontally polarized component of beam 310 at $\lambda_2$.

For the special case in which polarization state changer 224 is a Pockels cell 225 an axis of which is aligned in the plane orthogonal to the propagation direction of beam 203 and at an angle $\phi$ with the plane of horizontal polarization of beam 203 (as shown in FIG. 14A), one may define a power factor $\eta$ that expresses the ratio of (a) the power in frequency-converted beam 312 at $\lambda_3$ to (b) the maximum power in frequency-converted beam 312 at $\lambda_3$. The equation for that power factor $\eta$ is as follows:

$$\eta = (\cos^4\phi + \sin^4\phi + \tfrac{1}{2}\sin^2(2\phi)\cdot\cos\delta)^2, \qquad \text{(Eq. A)}$$

where $\delta$ is the phase delay between the two optical axes of the Pockels cell. For the special case in which $\phi=45$ degrees (which is the preferred orientation when polarization state changer 224 includes a Pockels cell 225), the equation for power factor $\eta$ simplifies to the following expression:

$$\eta = (0.5 + 0.5\cos\delta)^2. \qquad \text{(Eq. B)}$$

FIG. 14B is a plot of $\eta$ versus $\delta$ for Eq. B. In FIG. 14B the open squares highlight values of $\eta$ for 10 degree increments of $\delta$.

Figure 15A:
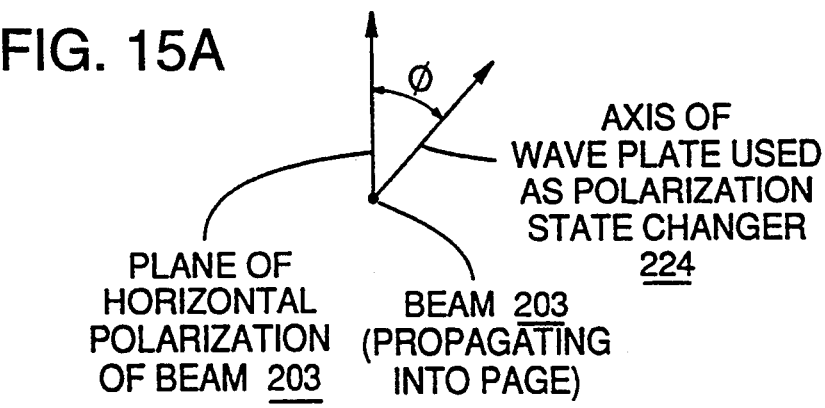
FIG. 15A illustrates the definition of the angle $\phi$ between the axis of a rotatable wave plate polarization state changer and the plane of polarization of beam 203 in FIGS. 10–13.

In a special case (not shown), polarization state changer 224 is a wave plate arranged with its axis in the plane orthogonal to the direction of beam 203 and at an angle $\phi$ with respect to the polarization plane of horizontally polarized beam 203 (as shown in FIG. 15A). For this special case the equation for power control factor $\eta$ is, for a half-wave plate, $$\eta = \cos^4(2\phi), \qquad \text{(Eq. C)}$$

and, for a quarter-wave plate, $$\eta = (\cos^4\phi + \sin^4\phi)^2. \qquad \text{(Eq. D)}$$

Figure 15B:
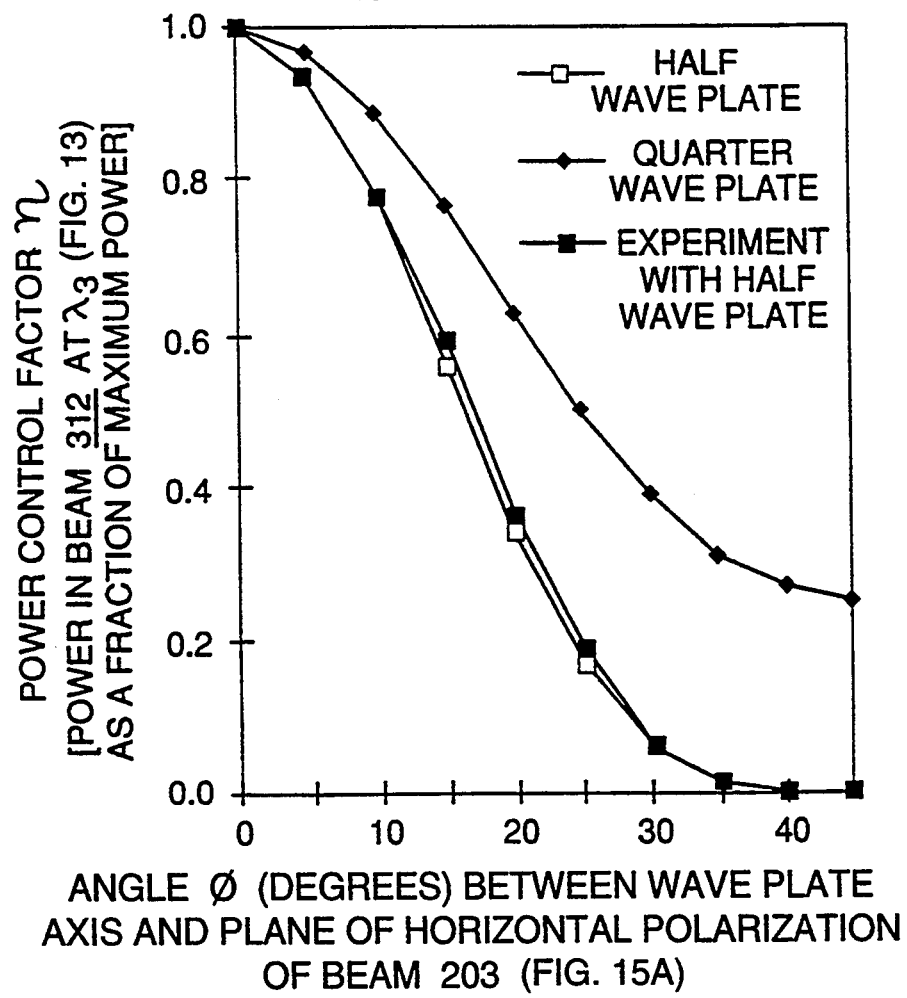
FIG. 15B is a graph of the power control factor $\eta$ of a frequency-converted beam shown in FIG. 13 against the rotation angle between the wave plate axis and the plane of horizontal polarization of the original beam.

FIG. 15B contains a plot of $\eta$ versus $\phi$ for a rotatable half-wave plate (Eq. C) and for a rotatable quarter-wave plate (Eq. D). FIG. 15B also contains the results of an experiment in which a rotatable half-wave plate was rotated about the beam path. FIG. 15B shows excellent agreement between predicted and experimental values for this case.

In the particular example in which polarization state changer 224 is a Pockels cell 225, Eq. A indicates that the power factor $\eta$ may be varied by varying the phase delay $\delta$ between the two axes of Pockels cell 225. This may be done by varying the voltage applied as STATE SIGNAL 226 over line 230 from control unit 228.

In the particular example in which polarization state changer 224 is a rotatable half-wave or quarter-wave plate (not shown in the drawings), Eqs. C and D respectively show that the power factor $\eta$ may be varied by rotating the wave plate about an axis defined by the direction in which beam 203 propagates. If the rotation is accomplished by a motor or other electromechanical device (not shown) under control of STATE SIGNAL 226 from control unit 228, control unit 228 may thereby control the extent of such rotation and thus also control the power factor $\eta$.

Although a rotatable wave plate has the disadvantage of slow speed, it is a simple, low-cost polarization state changer. In addition, because a wave plate is very thin, the accuracy of its alignment perpendicular to the beam path does not significantly affect the positional accuracy of its output beam.

Beam 312 produces beams 314, 316, (optionally) 317, 318, and 320, all at $\lambda_3$, in the same way that (in FIG. 11) beam 238 produces beams 244, 248, (optionally) 266, 258, and 262, respectively. (Optional) detector 268 responds to beam 317 as it does to beam 266 of FIG. 11. The portion of beam 310 not converted into beam 312 emerges from frequency converter 236 as a beam 324 at $\lambda_2$; beam 324 is in a different elliptical polarization from that of beam 310 because of the conversion of some of the energy in the horizontally polarized component of beam 310 into beam 312 in frequency converter 236. Beam 324 passes through beam splitter 242 and emerges as a beam 326, which impinges on polarizing beam splitter 274. The horizontally polarized component of beam 326 emerges from polarizing beam splitter 274 as a beam 328 at $\lambda_2$, which is absorbed in beam damper 278. The vertically polarized component of beam 326 reflects from polarizing beam splitter 274 as a beam 330 at $\lambda_2$, which produces beams 332, 334, and 336 at $\lambda_2$ in the same way that (in FIG. 12) beam 296 produces beams 300, 304, and 306.

With continued reference to FIG. 13, beam 205 contains beam 320 at $\lambda_3$ and beam 336 at $\lambda_2$. The power in beam 320 is substantially the same as the power in beam 312. The power in beam 336 depends on the power in the vertically polarized component of beam 310.

It is thus apparent that the power in beam 312 and hence in beam 320 at $\lambda_3$ is variable under control of control unit 228. The power in beams 312 and 320 can thus be varied without affecting the lasing action in first stage 202.

These are substantial advantages over prior art systems. First, because the power control of the converted laser wavelength $\lambda_3$ is done without affecting the operating condition of first stage 202, first stage 202 can operate at its optimized condition as to realized maximum output power and stability. Second, because of the quick response of polarization state changer 224 when it includes a Pockels cell 225, it is possible to control the power of each frequency-converted laser pulse at $\lambda_3$. Third, the invention can be used for power control of any kind of laser frequency conversion, including second harmonic generation, third harmonic generation, fourth harmonic generation, and optical parametric oscillation ("OPO") and/or amplification ("OPA").

Skilled persons will appreciate that the invention can be used for power control of laser frequency mixing which utilizes two original laser sources instead of one, as shown in FIG. 16.

FIG. 16 shows as an example a laser source 340 emitting horizontally polarized light $\lambda_2$ and a laser source 342 emitting vertically polarized light at $\lambda_2'$. The beams at $\lambda_2$ and $\lambda_2'$ propagate along separate optical paths and can be of different values or the same value. Polarization state changer 224 intersects the path of the beam at $\lambda_2$ (but can optionally intersect the path of the beam at $\lambda_2'$) to selectively change the polarization state of the incident beam. The beam at $\lambda_2$ exiting polarization state changer 224 and the beam at $\lambda_2'$ strike a beam combiner 344, which sums the beams at $\lambda_2$ and $\lambda_2'$ and delivers them to a conventional optical frequency mixer 346. Mixer 346, which is a specific type of frequency converter 236, provides, for example, a dominant vertically polarized beam at $\lambda_3$ whose power level is controlled by the operation of polarization state changer 224 on the beam at $\lambda_2$.

Laser system 210 of the invention may be used in a variety of ways.

A first application of laser system 210 is in responding to direct detection of the effect of laser operations on a target.

Skilled persons will appreciate that laser system 210 can be operated in open-loop control to change quickly the intensity and/or the wavelength and/or the mixture of wavelengths in output beam 205 in response to commands from control unit 228. For example, an ultraviolet beam at 266 nanometers is useful for removing a coating of photoresist (such as polyimide) from a substrate (such as gold). Laser system 210 is configured to produce the ultraviolet beam at 266 nanometers by frequency doubling a beam 203 at a wavelength of 532 nanometers, which is in turn produced by frequency doubling a beam at 1064 nanometers produced by a Nd:YAG laser as the laser source in first stage 202, which delivers linearly polarized beam 203 in FIGS. 10–13.

Control unit 228 operates a Pockels cell 225 at a high power factor $\eta$ until detector 207 detects the greatly increased intensity of ultraviolet radiation 340 reflected by the gold after beam 320 has ablated the layer of photoresist. When that increased intensity is detected, control unit 228 rapidly reduces the power factor $\eta$, which in turn rapidly reduces the power in beam 320 at 266 nanometers to a level below that which would damage the gold substrate. (Alternatively, the control unit switches polarization state changer 224 to its third operative state, in which there is no output at the ultraviolet.) Beam 205 is then repositioned to a new area 338 on photoresist-covered gold target 206 from which the photoresist coating has not yet been removed, and control unit 228 increases the power factor $\eta$ to begin ablating the photoresist layer at that point. (Alternatively, control unit 228 switches polarization state changer 224 from its third operative state to its first operative state, in which an ultraviolet beam is produced.) These steps are then repeated until the task to be performed on the photoresist-covered gold is complete.

A second application of laser system 210 is in performing operations on a target with a beam at $\lambda_2$, a beam at $\lambda_3$, or a beam containing a beam at $\lambda_2$ and a beam at $\lambda_3$. Some operations to be performed on target 206 are optimally performed with a beam at $\lambda_2$, while other operations are optimally performed with a beam at $\lambda_3$. For example, for laser processing of semiconductor layers in photovoltaic panels, the best scribing result for a tin oxide layer could be realized by using a 1064 nanometer laser beam. For semiconductor material and metal electrode cutting on the same panel, however, a 532 nanometer laser beam could perform much better. (See James Golden, "Green Lasers Score Good Marks in Semiconductor Material Processing," *Laser Focus World*, June, 1992, pp. 75–88.) Thus, a laser with switchable wavelengths would simplify the entire process and enhance the throughput dramatically.

Usually, to process metal or metal-like materials, a shorter wavelength laser would be preferred because metals can absorb short wavelength energy more efficiently. But since laser frequency conversion efficiency is usually quite low, in some cases the available shorter wavelength laser power or energy alone would be insufficient to complete the processing. Because the absorption coefficient of most metals in their liquid state is dramatically larger than that in their solid state, as a practical alternative, a laser beam with mixed wavelengths, for example, of $\lambda_2$ and $\lambda_3$, is used. The shorter wavelength laser energy initiates the processing by melting the top surface of the target. Then the longer wavelength laser beam with much higher energy available efficiently completes the desired process.

The laser described in this invention has the capability of controlling the energy mixture of the different laser wavelengths and thereby optimizing the processing result for different applications.

A third application of laser system 210 is in controlling the intensity of an "initial pulse" of a train of repeated Q-switched beam pulses. When laser system 210 delivers a pulse after the gain medium in first stage 202 has been building an excess population inversion accumulation for some time, the intensity of that pulse is greater than the intensity of later continuous-wave operation or the intensity of later pulses in Q-switched pulsed operation where the interval between the pulses is shorter than the time needed to build up an excess population inversion accumulation or shorter than the time before the first pulse. Frequently the greater intensity of such an "initial pulse" is undesirable because it could damage a target 206 to which the pulse train is applied or produce a lack of uniformity of result (such as nonuniform etching) on target 206. The same need for achieving uniform pulse power also arises when (1) there is a pause between the end of one pulse train at a given pulse repetition rate and the beginning of another pulse train at the same repetition rate, and (2) there is a change in the pulse repetition rate in an ongoing pulse train. As discussed above, a temporary pause in a train of Q-switched pulses or a change in the pulse repetition rate commonly occurs when the motion of beam 232 over a substrate is temporarily slowed, such as when the direction of beam movement is changed or the beam is moved along a path which is more complex than a straight line. As used herein, the term "initial pulse" encompasses each of these situations.

As an example of the seriousness of this problem, a Nd:YAG gain medium will build a population inversion accumulation that is for all practical purposes at its maximum accumulation in a time of only approximately one-half millisecond. Thus, if a time longer than such an interval elapses before Q-switched pulsed operation of a Nd:YAG gain medium is begun or resumed, the first Q-switched pulse is for all practical purposes at a maximum intensity. Delays of longer than one-half millisecond between Q-switched pulses from a Nd:YAG gain medium are quite common in industrial applications.

Laser system 210 is operable to control the intensity of an initial pulse by using polarization state changer 224 to vary the power factor $\eta$ for the initial pulse. In a first alternative control unit 228 may contain a timer which measures the time elapsed since the last Q-switched pulse or other output. Logic circuitry (not shown) within control unit 228 responds to the measurement of time since the last output by varying STATE SIGNAL 226 (and thus the state of polarization state changer 224) to reduce the power factor $\eta$ (see Eqs. A–D, FIGS. 14B and 15B, and accompanying description) so that the additional intensity of the next or "initial" Q-switched pulse will be offset by the reduced power factor $\eta$. To determine the appropriate power factor $\eta$, the logic uses Eqs. A–D and/or the relationship graphed in FIGS. 14B and 15B, together with data concerning the way the initial pulse power of the specific gain medium which is used increases with time with the specific pumping mechanism used to power that gain medium. This is most conveniently accomplished with a specialized waveform by which control unit 228 automatically drives STATE SIGNAL 226 and thus polarization state changer 224 (which in this case is preferably a Pockels cell 225) during the time since the last discharge of the laser. This process can be performed with either a closed-loop or an open-loop control system. If the power factor $\eta$ is continuously varied in that way, the next pulse will have a constant power even when the time before that next pulse is randomly determined. This permits equalizing the power in Q-switched pulses over a large range of pulse repetition rates.

A fourth application of the power control capability of laser system 210 is in precisely controlling the intensity of each pulse of a train of Q-switched pulses to achieve the best overall result in a laser machining operation. For example, in ablating a photoresist coating from a substrate to form a channel (sometimes called a "via") into which a metal or other substance will be sputtered, it is useful to control the slope of the wall of the channel. The slope of that wall is controlled more precisely by controlling the power in the train of Q-switched pulses which remove photoresist to create the channel. If, for example, 50 pulses are needed to make the channel, precise control of the peak power in each of those 50 pulses could improve the slope characteristics of the channel.

A fifth application of laser system 210 is in controlling the power in a Q-switched pulse while that pulse is in the process of discharging. The response of the polarization state changer 224 could be very fast; for example, when a Pockels cell is used, its response time would be on the order of a few nanoseconds. By controlling the voltage signal shape applied to the Pockels cell, the converted laser beam shape at $\lambda_3$ could easily be controlled accordingly. This capability is not limited only to the case in which the laser in first stage 202 is a Q-switched laser. This approach is viable as long as the laser pulse width or duration is comparable to or longer than the Pockels cell response time. The first stage laser could, therefore, also be, for example, a quasi-continuous-wave laser or straight continuous-wave laser. This approach is not, however, viable for the case in which the first stage laser is of a mode-locked type.

It will be apparent to skilled persons that many changes may be made to the details of the specific embodiments of the invention described herein without departing from underlying principles thereof. The scope of the invention should accordingly be determined only by the following claims.

We claim:

1. A laser system for selectively producing one of a first output beam at a first wavelength and a second output beam at a second wavelength different from the first wavelength, the laser system comprising:
a first beam returner;
a second beam returner;
a gain structure, the first beam returner, the second beam returner, and the gain structure defining a resonant cavity characterized by a Q factor and a lasing path, the gain structure responsive to a source of pumping energy to produce in the cavity and along the path an incident beam at a first wavelength and in a selected polarization state of a set of orthogonal polarization states;
a polarization state changer located in the cavity and on the path, the polarization state changer responsive to a control signal to assume selectively one of a first state, a second state, and a third state, the polarization state changer in the first state responsive to the incident beam to produce an intermediate beam without change of polarization state, the polarization state changer in the second state reducing the Q factor sufficiently to prevent lasing in the cavity, the polarization state changer in the third state responsive to the incident beam to produce a polarization-state-changed beam in a polarization state orthogonal to the selected polarization state;
a frequency converter located in the cavity and on the path, the frequency converter responsive to the intermediate beam to produce a frequency-converted beam at the second wavelength, the frequency converter responsive to the polarization-state-changed beam to pass that beam as a passed beam;
first means for coupling a portion of the passed beam out of the cavity as the first output beam; and
second means for coupling a portion of the frequency-converted beam out of the cavity as the second output beam,
whereby the laser system selectively produces under control of the state signal one of the first output beam, the second output beam, and no output beam.

2. The laser system of claim 1, wherein the gain structure comprises a gain medium operable to produce inherently the incident beam in the selected polarization state.

3. The laser system of claim 1, wherein the gain structure comprises a gain medium and a polarizing element that passes beams in the selected polarization state, the polarizing element located in the cavity and on the path.

4. The laser system of claim 1, wherein:
the first means comprises an output coupler located in the cavity and on the path, the output coupler having a moderate output coupling efficiency for beams at the first wavelength in a polarization state orthogonal to the selected polarization state; and
the passed beam has a component in the polarization state orthogonal to the selected polarization state, whereby the output coupler couples out of the cavity a portion of the component of the passed beam in the polarization state orthogonal to the selected polarization state.

5. The laser system of claim 1, wherein:
the frequency converter is responsive to the intermediate beam to produce the frequency-converted beam in a polarization state orthogonal to the selected polarization state; and
the first and second means comprise an output coupler located in the cavity and on the path, the output coupler having, for beams in a polarization state orthogonal to the selected polarization state, a moderate output coupling efficiency for beams at the first wavelength and a high output coupling efficiency for beams at the second wavelength.

6. The laser system of claim 5, wherein the output coupler has substantially zero output coupling efficiency for beams at the first wavelength in the selected polarization state.

7. The laser system of claim 5, wherein the output coupler is located between the gain structure and the frequency converter.

8. The laser system of claim 5, wherein the first and second means couple the first and second output beams out of the cavity substantially collinearly.

9. The laser system of claim 1, wherein the frequency converter comprises a Type I-cut frequency-doubling crystal.

10. A method of operating the laser system of claim 1, comprising the step of supplying to the gain structure pumping energy sufficient to cause a population inversion in the gain structure.

11. The method of claim 10, further comprising the steps of:
causing the polarization state changer to assume its second state for a predetermined time; and then
causing the polarization state changer to assume its first state,
whereby, when the polarization state changer assumes its first state, the laser system produces the second output beam including a Q-switched output pulse at the second wavelength and with an intensity affected by the predetermined time.

12. The method of claim 10, further comprising the steps of:
causing the polarization state changer to assume its second state for a predetermined time; and then
causing the polarization state changer to assume its third state,
whereby, when the polarization state changer assumes its third state, the laser system produces the first output beam including a Q-switched output pulse at the first wavelength and with an intensity affected by the predetermined time.

13. The method of claim 10, further comprising the steps of:
causing the polarization state changer to assume its first state, whereby the laser system produces the second output beam including a continuous-wave output at the second wavelength, and then
causing the polarization state changer to assume its third state, whereby the laser system produces the first output beam including a continuous-wave output at the first wavelength.

14. The method of claim 10, further comprising the steps of:
causing the polarization state changer to assume its third state, whereby the laser system produces the first output beam including a continuous-wave output at the first wavelength, and then causing the polarization state changer to assume its first state, whereby the laser system produces the second output beam including a continuous-wave output at the second wavelength.

15. The method of claim 10, further comprising the steps of:

causing the polarization state changer to assume its second state for a predetermined time; and then causing the polarization state changer to assume its first state, whereby, when the polarization state changer assumes its first state, the laser system produces the second output beam including a Q-switched output pulse at the second wavelength and with an intensity affected by the predetermined time; and then causing the polarization state changer to assume its third state, whereby the laser system produces the first output beam including a continuous-wave output at the first wavelength.

16. The method of claim 10, further comprising the steps of:

causing the polarization state changer to assume its second state for a predetermined time; and then causing the polarization state changer to assume its third state, whereby, when the polarization state changer assumes its third state, the laser system produces the first output beam including a Q-switched output pulse at the first wavelength and with an intensity affected by the predetermined time; and then causing the polarization state changer to assume its first state, whereby the laser system produces the second output signal including a continuous-wave output at the second wavelength.

17. The method of claim 10, further comprising the steps of:

causing the polarization state changer to assume its second state for a second predetermined time, and then causing the polarization state changer to assume its first state, whereby, when the polarization state changer assumes its first state, the laser system produces the second output beam including a Q-switched output pulse at the second wavelength and with an intensity affected by the second predetermined time; and then causing the polarization state changer to assume its second state for a first predetermined time, and then causing the polarization state changer to assume its third state, whereby, when the polarization state changer assumes its third state, the laser system produces the first output beam including a Q-switched output pulse at the first wavelength and with an intensity affected by the first predetermined time.

18. The method of claim 10, further comprising the steps of:

causing the polarization state changer to assume its second state for a first predetermined time, and then causing the polarization state changer to assume its third state, whereby, when the polarization state changer assumes its third state, the laser system produces the first output beam including a Q-switched output pulse at the first wavelength and with an intensity affected by the first predetermined time; and then causing the polarization state changer to assume its second state for a second predetermined time, and then causing the polarization state changer to assume its first state, whereby, when the polarization state changer assumes its first state, the laser system produces the second output beam including a Q-switched output pulse at the second wavelength and with an intensity affected by the second predetermined time.

19. A device for controlling the power in a frequency-converted beam at a second wavelength produced by an incident beam at a first wavelength, the incident beam propagating from a resonant cavity in response to a source of pumping energy, and resolvable into a first linear combination of a set of orthogonal polarization states at the first wavelength, the first wavelength different from the second wavelength, the device comprising:

a polarization state changer positioned outside the cavity and responsive to the incident beam to produce an intermediate beam at the first wavelength, the intermediate beam resolvable into a second linear combination of the set of orthogonal polarization states; and a frequency converter responsive to a selected one of the orthogonal polarization states of the intermediate beam to produce the frequency-converted beam at the second wavelength, and the polarization state changer further responsive to a state signal to vary the second linear combination so as to vary the power in the selected polarization state of the intermediate beam so that the power in the frequency-converted beam is variable under control of the state signal.

20. The device of claim 19, wherein the frequency-converted beam is in a polarization state orthogonal to the selected polarization state.

21. The device of claim 19, wherein:

the frequency converter comprises one of a Type I-cut frequency doubling crystal, a Type II-cut frequency doubling crystal, a frequency tripler, an optical parametric oscillator, an optical parametric amplifier, and an optical mixer.

22. The device of claim 19, wherein:

the polarization state changer comprises a wave plate at the first wavelength, and the wave plate is rotatable in response to the state signal to vary the second linear combination, whereby the power in the frequency-converted beam is variable by rotation of the wave plate.

23. The device of claim 22, wherein the state signal comprises one of manual actuation, mechanical actuation, and electrical actuation.

24. The device of claim 19, wherein:

the polarization state changer comprises a Pockels cell operable at the first wavelength; and the state signal comprises an electrical potential applied to the Pockels cell, whereby the power in the frequency-converted beam is variable under control of the applied electrical potential.

25. The device of claim 19, further comprising:

means for directing the output beam on a target;

a detector responsive to a detected portion of the output beam to produce an indication of the condition of the target; and a control unit responsive to the indication to vary the state signal, whereby the composition of the output beam is controlled in response to the indication.

26. The device of claim 19, further comprising a control unit responsive to a routine for varying the state signal, whereby the output beam is variable according to the routine.

27. The device of claim 19, further comprising a resonant cavity operable in response to a source of pumping energy to produce the incident beam along an output path outside the cavity, the incident beam in the selected polarization state;

wherein:
the polarization state changer is further located outside the cavity and along the output path and responsive to the state signal to assume selectively one of a first state and a third state, the polarization state changer in the first state responsive to the incident beam to produce the intermediate beam without change of polarization state, the polarization state changer in the third state responsive to the incident beam to produce the intermediate beam in a polarization state orthogonal to the selected polarization state, and the frequency converter is further located outside the cavity and on the output path and responsive to components of the intermediate beam in the polarization state orthogonal to the selected polarization state to pass those components as a passed beam;

and further comprising:
a first beam director operable to direct the passed beam as a first output component, and a second beam director operable to direct the frequency-converted beam as a second output component, whereby the device selectively produces under control of the state signal the output beam including one of the first output component and the second output component.

28. The device of claim 27, wherein the polarization state changer is further responsive to the control signal to assume selectively a second state, the polarization state changer in the second state responsive to the incident beam to produce the intermediate beam in a linear combination of component beams in the set of orthogonal polarization states.

29. A method of operating the device of claim 28, comprising the step of supplying to the resonant cavity sufficient pumping energy to create and maintain a population inversion.

30. The method of claim 29, further comprising the steps of:
placing the polarization state changer in the first state for a first time; and then
placing the polarization state changer in the second state for a second time,
whereby the output beam includes a component at the second wavelength for the first time and a mixture of a component at the first wavelength and a component at the second wavelength for the second time.

31. The method of claim 29, further comprising the steps of:
placing the polarization state changer in the second state for a first time; and then
placing the polarization state changer in the first state for a second time,
whereby the output beam includes a mixture of a component at the first wavelength and a component at the second wavelength for the first time and a component at the second wavelength for the second time.

32. The method of claim 29, further comprising the steps of:
placing the polarization state changer in the third state for a first time; and then
placing the polarization state changer in the second state for a second time,
whereby the output beam includes a component at the first wavelength for the first time and a mixture of a component at the first wavelength and a component at the second wavelength for the second time.

33. The method of claim 29, further comprising the steps of:
placing the polarization state changer in the second state for a first time; and then
placing the polarization state changer in the third state for a second time,
whereby the output beam includes a mixture of a component at the first wavelength and a component at the second wavelength for the first time and a component at the first wavelength for the third time.

34. The device of claim 27, wherein the polarization state changer is further responsive to the control signal to assume selectively a second state selected from plural second states, the polarization state changer in any one of the plural second states responsive to the incident beam to produce the intermediate beam in a corresponding one of plural linear combinations of component beams in the set of orthogonal polarization states.

35. A method of operating the device of claim 34, the method comprising the steps of:
supplying to the resonant cavity sufficient pumping energy to create and maintain a population inversion;
placing the polarization state changer in a first one of the second states for a first time; and then
placing the polarization state changer in a second one of the second states for a second time, the first one of the second states different from the second one of the second states,
whereby the output beam includes a first mixture of a component at the first wavelength and a component at the second wavelength for the first time and a second mixture of a component at the first wavelength and a component at the second wavelength for the second time, the first mixture different from the second mixture.

36. A method of operating the device of claim 27, comprising the step of supplying to the resonant cavity sufficient pumping energy to create and maintain a population inversion.

37. The method of claim 36, further comprising the steps of:
placing the polarization state changer in the first state for a first time; and then placing the polarization state changer in the third state for a second time, whereby the output beam includes a component at the second wavelength for the first time and a component at the first wavelength for the second time.

38. The method of claim 36, further comprising the steps of:

placing the polarization state changer in the third state for a first time; and then placing the polarization state changer in the first state for a second time, whereby the output beam includes a component at the first wavelength for the first time and a component at the second wavelength for the second time.

39. A method of controlling the power in a frequency-converted beam at a second wavelength produced by an incident beam at a first wavelength propagating from a laser oscillator, comprising:

directing the incident beam at the first wavelength to a polarization state changer positioned external to the laser oscillator;

providing a state signal to the polarizer state changer to produce an intermediate beam at the first wavelength in a polarization state corresponding to the state signal;

directing the intermediate beam to a frequency converter to produce the frequency-converted beam at the second wavelength; and controlling the power in the frequency-converted beam at the second wavelength by using the state signal to set the polarization state of the intermediate beam at the first wavelength without affecting the stability of and power in the incident beam.

40. The method of claim 39 wherein the polarization state changer comprises a Pockels cell operable at the first wavelength.

41. The method of claim 39 wherein setting the magnitude of the state signal sets the polarization state of the intermediate beam at the first wavelength.

42. The method of claim 39, wherein:

the frequency converter comprises one of a Type I-cut frequency doubling crystal, a Type II-cut frequency doubling crystal, a frequency tripler, an optical parametric oscillator, an optical parametric amplifier, and an optical mixer.

43. The method of claim 39 wherein the polarization state changer comprises a rotation-controllable wave plate.

* * * * *